United States Patent
Yeoh et al.

(10) Patent No.: US 9,978,182 B2
(45) Date of Patent: May 22, 2018

(54) TECHNIQUE FOR MORE EFFICIENTLY DISPLAYING TEXT IN VIRTUAL IMAGE GENERATION SYSTEM

(71) Applicant: MAGIC LEAP, INC., Plantation, FL (US)

(72) Inventors: Ivan Li Chuen Yeoh, Fort Lauderdale, FL (US); Samuel A. Miller, Hollywood, FL (US); Randall E. Hand, Clinton, MS (US); Lionel Ernest Edwin, Hollywood, FL (US); Philip O'Connor, Miami Beach, FL (US); Brian David Schwab, Sunrise, FL (US); Spencer Lindsay, Plantation, FL (US)

(73) Assignee: MAGIC LEAP, INC., Plantation, FL (US)

(*) Notice: Subject to any disclaimer, the term of this patent is extended or adjusted under 35 U.S.C. 154(b) by 0 days. days.

(21) Appl. No.: 15/198,983

(22) Filed: Jun. 30, 2016

(65) Prior Publication Data

US 2017/0032575 A1   Feb. 2, 2017

Related U.S. Application Data

(60) Provisional application No. 62/187,062, filed on Jun. 30, 2015.

(51) Int. Cl.
*G09G 5/00* (2006.01)
*G06T 19/00* (2011.01)
(Continued)

(52) U.S. Cl.
CPC ........ *G06T 19/006* (2013.01); *G02B 27/0172* (2013.01); *G06F 3/011* (2013.01); *G06F 3/017* (2013.01); *G06F 17/211* (2013.01); *G06K 9/00335* (2013.01); *G06K 9/00442* (2013.01); *G06K 9/4661* (2013.01); *G06K 9/52* (2013.01); *G06T 7/20* (2013.01); *G06T 7/60* (2013.01); *G06T 19/00* (2013.01);
(Continued)

(58) Field of Classification Search
CPC ... G06T 19/006; G02B 27/0172; G06F 3/011; G06F 3/017; G06K 9/00335; G06K 9/00442; G06K 9/4661; G06K 9/52
USPC ........................................ 345/619, 632, 633
See application file for complete search history.

(56) References Cited

U.S. PATENT DOCUMENTS

| 8,953,889 B1 | 2/2015 | Worley, III et al. |
| 2002/0105482 A1* | 8/2002 | Lemelson ............. G06F 3/0485 345/7 |

(Continued)

OTHER PUBLICATIONS

PCT International Search Report and Written Opinion for International Appln. No. PCT/US16/40449, Applicant Magic Leap, Inc., forms PCT/ISA/210, 220, and 237, dated Sep. 19, 2016 (17 pages).

*Primary Examiner* — Xiao Wu
*Assistant Examiner* — Sarah Lhymn
(74) *Attorney, Agent, or Firm* — Vista IP Law Group LLP

(57) ABSTRACT

A virtual image generation system and method of operating same is provided. An end user is allowed to visualize the object of interest in a three-dimensional scene. A text region is spatially associated with the object of interest. A textual message that identifies at least one characteristic of the object of interest is generated. A textual message is streamed within the text region.

22 Claims, 22 Drawing Sheets

(51) Int. Cl.
- *G02B 27/01* (2006.01)
- *G06K 9/00* (2006.01)
- *G06K 9/46* (2006.01)
- *G06K 9/52* (2006.01)
- *G06T 7/20* (2017.01)
- *G06T 7/60* (2017.01)
- *G06F 3/01* (2006.01)
- *G06F 17/21* (2006.01)

(52) U.S. Cl.
CPC ............... *G02B 2027/014* (2013.01); *G02B 2027/0141* (2013.01); *G02B 2027/0178* (2013.01); *G06T 2207/20112* (2013.01); *G06T 2219/004* (2013.01)

(56) References Cited

U.S. PATENT DOCUMENTS

| | | | | |
|---|---|---|---|---|
| 2008/0084427 | A1* | 4/2008 | Delahunt | G09B 19/00 345/581 |
| 2013/0050432 | A1* | 2/2013 | Perez | H04N 13/0278 348/47 |
| 2013/0278631 | A1 | 10/2013 | Border et al. | |
| 2013/0321390 | A1* | 12/2013 | Latta | G06T 11/00 345/419 |
| 2014/0186010 | A1* | 7/2014 | Guckenberger | G11B 27/031 386/248 |
| 2014/0189515 | A1 | 7/2014 | Waldman et al. | |
| 2014/0253437 | A1 | 9/2014 | Vaught et al. | |
| 2014/0313135 | A1* | 10/2014 | Pisters | G06F 3/0484 345/173 |

* cited by examiner

MENU FOR ABC COFFEE SHOP

20

Coffee, Decaf, Soy

22a

Strawberry Filled Danish

22b

Strawberry, Pineapple, Mango Smoothie

22c

MENU FOR ABC COFFEE SHOP

MENU FOR ABC COFFEE SHOP

202

20 → 22a

22b

22c

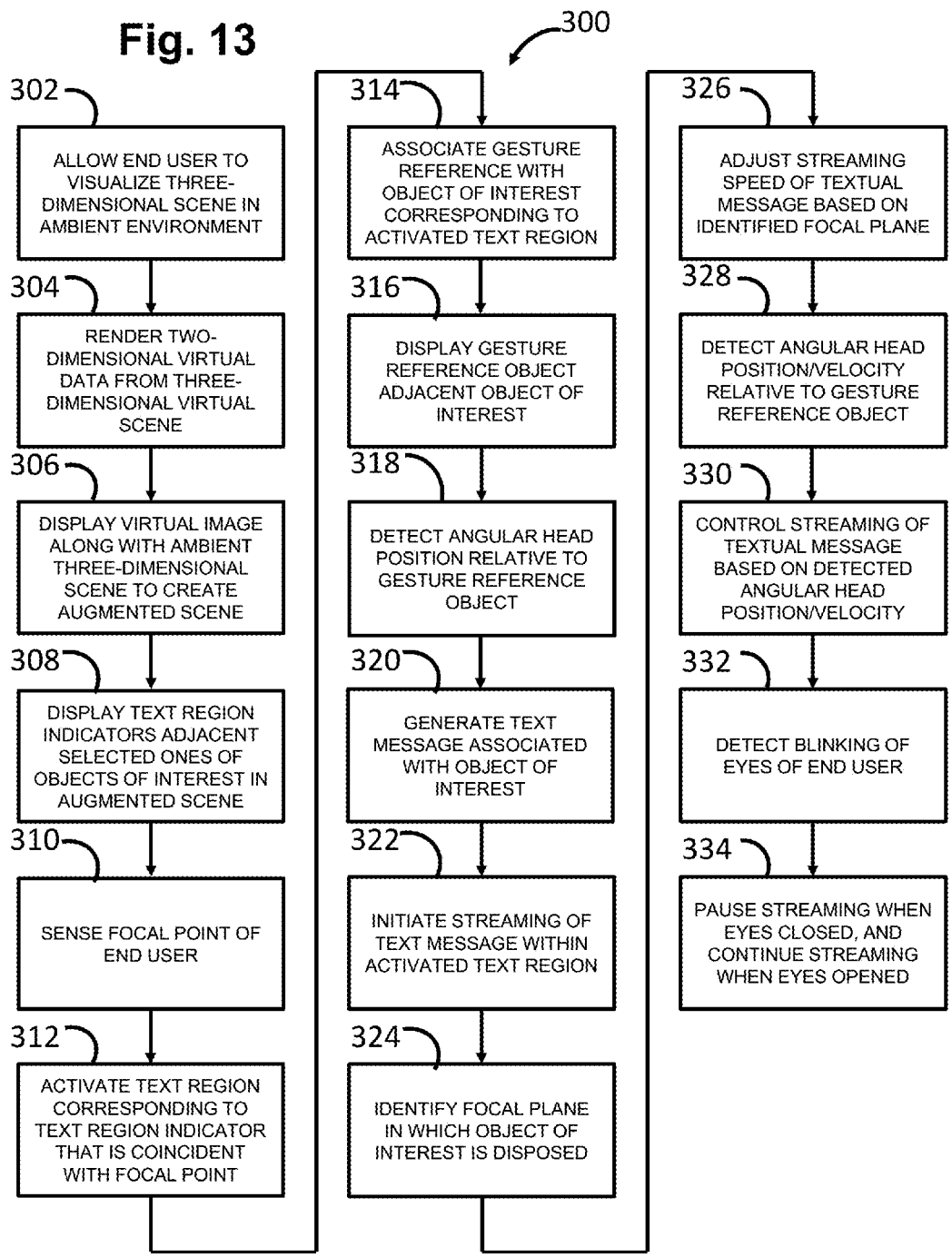

TECHNIQUE FOR MORE EFFICIENTLY DISPLAYING TEXT IN VIRTUAL IMAGE GENERATION SYSTEM

CROSS-REFERENCE TO RELATED APPLICATION

This application claims priority to U.S. Provisional Application Ser. No. 62/187,062, filed on Jun. 30, 2015 entitled "TECHNIQUE FOR MORE EFFICIENTLY DISPLAYING TEXT IN VIRTUAL IMAGE GENERATION SYSTEM". The content of the aforementioned patent application is hereby expressly incorporated by reference in its entirety for all purposes as though set forth in full.

FIELD OF THE INVENTION

The present invention generally relates to systems and methods configured to facilitate interactive virtual and augmented reality environments for one or more users.

BACKGROUND

Modern computing and display technologies have facilitated the development of systems for so-called "virtual reality" or "augmented reality" experiences, wherein digitally reproduced images or portions thereof are presented to a user in a manner where they seem to be, or may be perceived as, real. A virtual reality (VR) scenario typically involves presentation of digital or virtual image information without transparency to other actual real-world visual input, whereas an augmented reality (AR) scenario typically involves presentation of digital or virtual image information as an augmentation to visualization of the actual world around the end user.

For example, referring to FIG. 1, an augmented reality scene 4 is depicted wherein a user of an AR technology sees a real-world park-like setting 6 featuring people, trees, buildings in the background, and a concrete platform 8. In addition to these items, the end user of the AR technology also perceives that he "sees" a robot statue 10 standing upon the real-world platform 8, and a cartoon-like avatar character 12 flying by which seems to be a personification of a bumble bee, even though these elements 10, 12 do not exist in the real world. As it turns out, the human visual perception system is very complex, and producing a VR or AR technology that facilitates a comfortable, natural-feeling, rich presentation of virtual image elements amongst other virtual or real-world imagery elements is challenging.

VR and AR systems typically employ head-worn displays (or helmet-mounted displays, or smart glasses) that are at least loosely coupled to a user's head, and thus move when the end user's head moves. If the end user's head motions are detected by the display system, the data being displayed can be updated to take the change in head pose (i.e., the orientation and/or location of user's head) into account.

As an example, if a user wearing a head-worn display views a virtual representation of a three-dimensional (3D) object on the display and walks around the area where the 3D object appears, that 3D object can be re-rendered for each viewpoint, giving the end user the perception that he or she is walking around an object that occupies real space. If the head-worn display is used to present multiple objects within a virtual space (for instance, a rich virtual world), measurements of head pose can be used to re-render the scene to match the end user's dynamically changing head location and orientation and provide an increased sense of immersion in the virtual space.

Head-worn displays that enable AR (i.e., the concurrent viewing of real and virtual elements) can have several different types of configurations. In one such configuration, often referred to as a "video see-through" display, a camera captures elements of a real scene, a computing system superimposes virtual elements onto the captured real scene, and a non-transparent display presents the composite image to the eyes. Another configuration is often referred to as an "optical see-through" display, in which the end user can see through transparent (or semi-transparent) elements in the display system to view directly the light from real objects in the environment. The transparent element, often referred to as a "combiner," superimposes light from the display over the end user's view of the real world.

In certain VR and AR systems, it is desirable to display text adjacent an object presently viewed by a user. For example, if the end user enters a coffee shop and views a cup of coffee 22a, a danish 22b, and a smoothie 22c displayed on an actual or virtual menu 20, as illustrated in FIG. 2, it may be desirable to textually display a descriptive message (e.g., "coffee, decaf, soy") adjacent the cup of coffee 22a, a descriptive message (e.g., strawberry flavored danish) adjacent the danish 22b, and a descriptive message (e.g., strawberry, pineapple, mango smoothie) adjacent the smoothie 22c to facilitate the end user's decision as to whether to order the cup of coffee 22a, the danish 22b, and/or the smoothie 22c, which may involve ordering it via conventional communication with the vendor or electronically ordering it via verbal or non-verbal cues provided by the end user through the VR and AR system. While textually displaying descriptive messages adjacent actual or virtual objects to which the messages pertain works well in theory, the resolution of present-day display technology is limited in that fine print cannot be resolved, and therefore a large area is needed to display the coarse print, thereby potentially cluttering the three-dimensional scene viewed by the end user.

There, thus, is a need to more efficiently display a message adjacent a virtual or actual objects in a virtual reality or augmented reality system.

SUMMARY

In accordance with a first aspect of the present inventions, a method of operating a virtual image generation system comprises allowing an end user to visualize a three-dimensional scene, spatially associating a text region (which may be displayed) within the field of view of the user, generating a textual message, and streaming the textual message within the text region. In one method, the textual message is streamed within the text region only one word at a time. In another method, the textual message is displayed in the textual region at least two words at a time while emphasizing only one of the displayed words. Emphasizing the one word may comprise displaying the one word with a brightness intensity more than the remaining displayed word or words, or the text region may be a three-dimensional text region, in which case, the one word may be displayed in a foreground of the three-dimensional text region, and the remaining displayed word or words may be displayed in a background of the three-dimensional text region.

One method further comprises allowing the end user to visualize an object of interest in the three-dimensional scene, in which case, the text region may be spatially associated with the object of interest, and the textual image may identify at least one characteristic of the object of interest (e.g., by identifying a name of the object of interest). If the object of interest is movable, spatially associating the text region with the object of interest may comprise linking the text region with the object of interest, such that text region moves in coordination with movement of the object of interest. The method optionally comprise displaying a text region indicator adjacent the object of interest, sensing a focal point of the end user, and activating the text region (e.g., by making the text region visually appear) when the focal point of the end user is coincident with the text region indicator. If the object of interest is a virtual object, allowing the end user to visualize the virtual object may comprise displaying the virtual object to the end user. If the object of interest is an actual object, allowing the end user to visualize the actual object may comprise allowing the end user to visualize directly light from the actual object.

The method may optionally comprise sensing a gestural command from the end user (e.g., a head movement or finger or hand movement), in which case, streaming the textual message may be controlled by the gestural command. For example, streaming of the textual message may be initiated or ceased in response to the gestural command. Or, the timing of each word of the textual message may be controlled in response to the gestural command. Or, the streaming speed of the textual message may be increased or decreased in response to the gestural command. Or, the direction of the streaming of the textual message may be changed in response to the gestural command.

One method further comprises associating a gesture reference with the object of interest, in which case, sensing the gestural command from the end user may comprise detecting an angular position of an anatomical part of the end user (e.g., a head or finger or hand) relative to a gesture reference. The gesture reference may be displayed as a gesture reference object adjacent the object of interest, and may be separate and distinct from the object of interest or may be object of interest, itself. In one embodiment, the gesture reference is an annular ring surrounding the object of interest.

The method may optionally comprise sensing blinking of the eyes of the end user, in which case, streaming of the textual message pauses when the eyes of the end user are closed, and continues when the eyes of the end user are opened. The method may further optionally comprise identifying a focal plane in which the object of interest is disposed, and adjusting the streaming speed of the textual message based on the identified focal plane. Optionally, streaming the textual message may comprise varying pauses between words of the textual message. The method may further optionally comprise generating a pattern of audible tones that respectively correspond temporally with words in the textual message as they are streamed.

In accordance with a second aspect of the present inventions, a virtual image generation system for use by an end user is provided. The virtual image generation system comprises a display system configured for allowing the end user to visualize a three-dimensional scene. In one embodiment, the display system is configured for being positioned in front of the eyes of the end user. In another embodiment, the display system includes a projection subsystem and a partially transparent display surface, in which case, the projection subsystem may be configured for projecting the frame onto the partially transparent display surface, and the partially transparent display surface may be configured for being position in the field of view between the eyes of the end user and an ambient environment. In another embodiment, the virtual image generation system further comprises a frame structure configured for being worn by the end user, in which case, the frame structure carries the display system.

The virtual image generation system further comprises a control system (e.g., one that comprises a graphics control subsystem unit (GPU)) configured for spatially associating a text region (which may be displayed to the end user) within a field of view of the end user. The control system is further configured for generating a textual message, and instructing the display system to stream the textual message within the text region. In one embodiment, the display system is configured for streaming the textual message within the text region by displaying the textual message only one word at a time. In another embodiment, the display system is configured for streaming the textual message within the text region by displaying the textual message at least two words at a time while emphasizing only one of the at least two displayed words. Emphasizing the one word may comprise displaying the one word with a brightness intensity more than the remaining displayed word or words, or the text region may be a three-dimensional text region, in which case, the one word may be displayed in a foreground of the three-dimensional text region, and the remaining displayed word or words may be displayed in a background of the three-dimensional text region.

In one embodiment, the display system is configured for allowing the end user to visualize an object of interest in the three-dimensional scene, the control system is configured for spatially associating the text region with the object of interest, and the textual image identifies at least one characteristic of the object of interest. If the object of interest is a virtual object, the display system may be configured for displaying the virtual object to the end user. If the object of interest is an actual object, the display system may be configured for allowing the end user to visualize directly light from the actual object. If the object of interest is movable, spatially associating the text region with the object of interest may comprise linking the text region with the object of interest, such that text region moves in coordination with movement of the object of interest. In an optional embodiment, the virtual image generation system further comprises one or more sensors configured for sensing a focal point of the end user, and the control system is configured for instructing the display system to display a text region indicator adjacent the object of interest, and activating the text region (e.g., by making the text region visually appear) when the focal point of the end user is coincident with the text region indicator.

The virtual image generation system may optionally comprise at least one sensor configured for sensing a gestural command from the end user, in which case, the control system may be configured for controlling the streaming of the textual message based on the gestural command (e.g., a head movement or finger or hand movement of the end user). For example, the control system may be configured for instructing the display system to initiate or cease streaming the textual message in response to the gestural command. Or, the control system may be configured for controlling the timing of each word of the textual message in response to the gestural command. Or, the control system may be configured for increasing or decreasing the streaming speed of the textual message in response to the gestural command. Or, the control system may be configured for changing the direction of the streaming of the textual message in response to the gestural command.

In one embodiment, the control system is further configured for associating a gesture reference with the object of interest, in which case, the sensor(s) will be configured for sensing the gestural command from the end user by detecting an angular position of an anatomical part of the end user (e.g., a head, finger, or hand) relative to a gesture reference. The control system may be further configured for instructing the display system to display the gesture reference as a gesture reference object adjacent the object of interest. The gesture reference may be separate and distinct from the object of interest or may be object of interest, itself. In one embodiment, the gesture reference is an annular ring surrounding the object of interest.

In an optional embodiment, the virtual image generation system further comprises one or more sensors configured for sensing blinking of the eyes of the end user, in which case, the control system may be configured for pausing the streaming of the textual message when the eyes of the end user are closed, and continue the streaming of the textual message when the eyes of the end user are opened. In another optional embodiment, the control system is further configured for identifying a focal plane in which the object of interest is disposed, and adjusting the streaming speed of the textual message based on the identified focal plane. In still another optional embodiment, the control system is configured for streaming the textual message by varying pauses between words of the textual message. In yet another optional embodiment, the virtual image generation system further comprises one or more speakers, in which case, the control system may be configured for instructing the speaker(s) to generate a pattern of audible tones that respectively correspond temporally with words in the textual message as they are streamed.

Additional and other objects, features, and advantages of the invention are described in the detail description, figures and claims.

BRIEF DESCRIPTION OF THE DRAWINGS

The drawings illustrate the design and utility of preferred embodiments of the present invention, in which similar elements are referred to by common reference numerals. In order to better appreciate how the above-recited and other advantages and objects of the present inventions are obtained, a more particular description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 13 is a flow diagram illustrated a method of operating the augmented reality system of FIG. 3 to stream and control a textual message adjacent an object of interest in an ambient three-dimensional scene.

DETAILED DESCRIPTION

The description that follows relates to display systems and methods to be used in augmented reality systems. However, it is to be understood that the while the invention lends itself well to applications in augmented reality, the invention, in its broadest aspects, may not be so limited.

Figure 1:
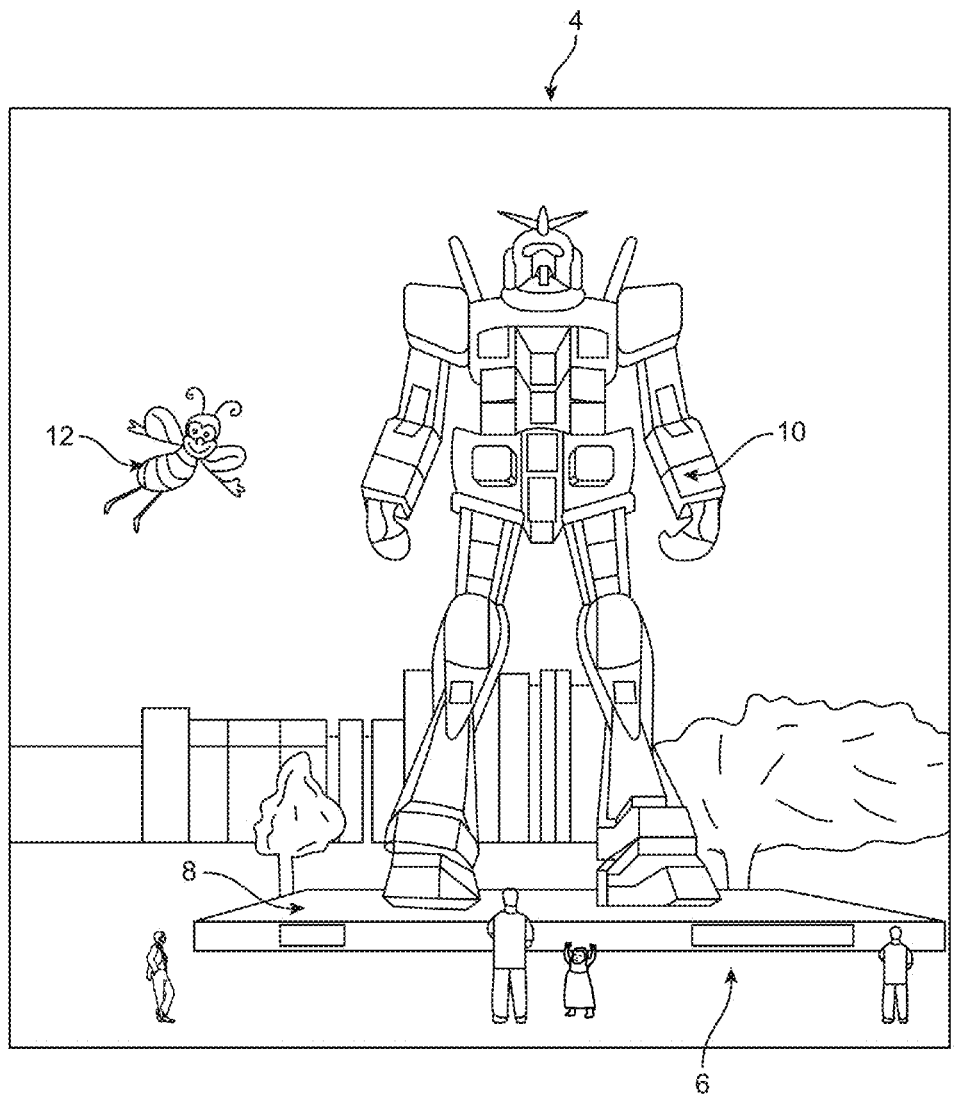
FIG. 1 is a picture of a three-dimensional augmented reality scene that can be displayed to an end user by a prior art augmented reality generation device.
Figure 2:
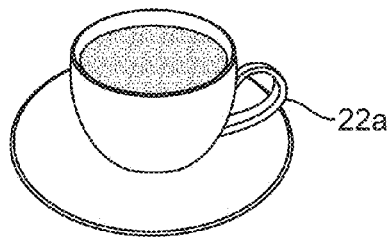
FIG. 2 is a plan view of a conventional coffee menu.
Figure 2:
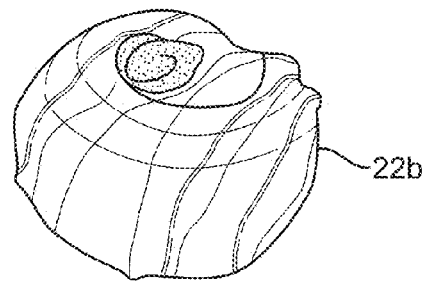
Figure 2:
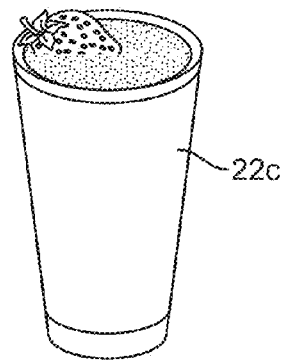
Figure 3:
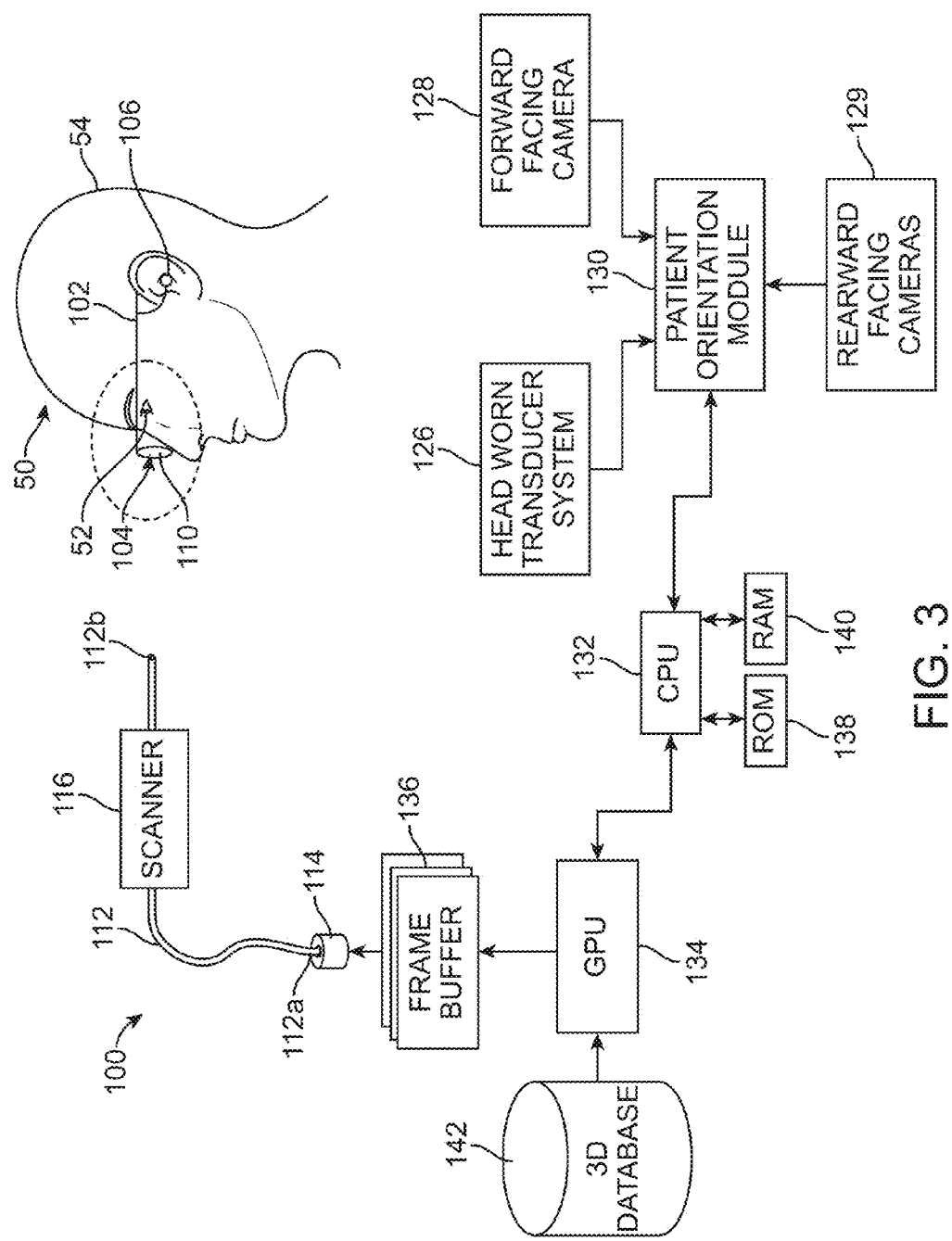
FIG. 3 is a block diagram of an augmented reality system constructed in accordance with one embodiment of the present inventions.
Figure 4:
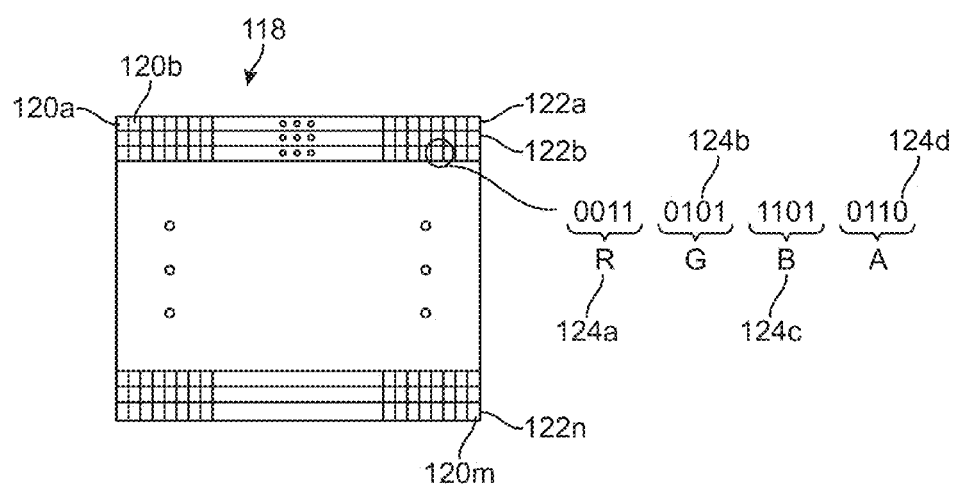
FIG. 4 is a plan view of an exemplary frame generated by the augmented reality system of FIG. 3.

Referring to FIG. 3, one embodiment of an augmented reality system 100 constructed in accordance with present inventions will now be described. The augmented reality system 100 provides images of virtual objects intermixed with actual objects in a field of view of an end user 50. The augmented reality system 100, and the various techniques taught herein, may be employed in applications other than augmented reality. For example, various techniques may be applied to any projection or display system. Or, the various techniques described herein may be applied to pico projectors where movement may be made by an end user's hand rather than the head. Thus, while often described herein in terms of an augmented reality system, the teachings should not be limited to such systems of such uses.

There are two fundamental approaches when operating the augmented reality system 100. A first approach employs one or more imagers (e.g., cameras) to capture images of the ambient environment. The augmented reality system 100 inter-mixes the virtual images into the data representing the images of the ambient environment. A second approach employs one or more at least partially transparent surfaces through which the ambient environment can be seen and on to which the augmented reality system 100 produces images of virtual objects.

The augmented reality system 100, and the various techniques taught herein, may be employed in applications other than augmented reality systems. For example, various techniques may be applied to any projection or display system. For example, the various techniques described herein may be applied to pico projectors where movement may be made by an end user's hand rather than the head. Thus, while often described herein in terms of an augmented reality system or virtual reality system, the teachings should not be limited to such systems of such uses.

At least for augmented reality applications, it may be desirable to spatially position various virtual objects relative to respective actual objects in a field of view of the end user 50. Virtual objects, also referred to herein as virtual tags or tag or call outs, may take any of a large variety of forms, basically any variety of data, information, concept, or logical construct capable of being represented as an image. Non-limiting examples of virtual objects may include: a virtual text object, a virtual numeric object, a virtual alphanumeric object, a virtual tag object, a virtual field object, a virtual chart object, a virtual map object, a virtual instrumentation object, or a virtual visual representation of a physical object.

More pertinent to the present inventions, the augmented reality system 100 spatially associates text regions with actual objects in the three-dimensional scene, generates a textual message in selected ones of text regions to identify at least one characteristic of respective actual object(s), and streams the textual message(s) within the selected text region(s). In one embodiment, one text region at a time is selected for streaming and display of the textual message, and in particular, the text region associated with the actual object at which the end user is currently looking is selected. Advantageously, streaming a textual message within a text region associated with an actual object facilitates the display of the textual message in a smaller area, thereby providing compactness in displaying the textual message and thereby reducing any clutter of the three-dimensional scene, providing brevity, interactivity, and quickness of display.

Although the textual message is described as being streamed in a text region associated with an actual object in an augmented reality system, it should be appreciated that a textual message can be streamed in a text region associated with a virtual object in an augmented reality system or a virtual reality system. Furthermore, a textual message can be streamed in a text region associated with an actual object in a visual system other than an augmented reality system, e.g., wherein the end user simply looks through a transparent medium that only displays textual messages (i.e., no virtual objects are displayed) adjacent actual objects.

To this end, the augmented reality system 100 comprises a frame structure 102 worn by an end user 50, a display system 104 carried by the frame structure 102, such that the display system 104 is positioned in front of the eyes 52 of the end user 50, and a speaker 106 carried by the frame structure 102, such that the speaker 106 is positioned adjacent the ear canal of the end user 50 (optionally, another speaker (not shown) is positioned adjacent the other ear canal of the end user 50 to provide for stereo/shapeable sound control). The display system 104 is designed to present the eyes 52 of the end user 50 with photo-based radiation patterns that can be comfortably perceived as augmentations to physical reality, with high-levels of image quality and three-dimensional perception, as well as being capable of presenting two-dimensional content. The display system 104 presents a sequence of frames at high frequency that provides the perception of a single coherent scene.

In the illustrated embodiment, the display system 104 comprises a projection subsystem 108 and a partially transparent display surface 110 on which the projection subsystem 108 projects images. The display surface 110 is positioned in the end user's 50 field of view between the eyes 52 of the end user 50 and an ambient environment. In the illustrated embodiment, the projection subsystem 108 includes one or more optical fibers 112 (e.g. single mode optical fiber), each of which has one end 112a into which light is received and another end 112b from which light is provided to the partially transparent display surface 110. The projection subsystem 108 may also include one or more light sources 114 that produces the light (e.g., emits light of different colors in defined patterns), and communicatively couples the light to the other end 112a of the optical fiber(s) 112. The light source(s) 114 may take any of a large variety of forms, for instance, a set of RGB lasers (e.g., laser diodes capable of outputting red, green, and blue light) operable to respectively produce red, green, and blue coherent collimated light according to defined pixel patterns specified in respective frames of pixel information or data. Laser light provides high color saturation and are highly energy efficient.

The display system 104 may further comprise a scanning device 116 that scans the optical fiber(s) 112 in a predetermined pattern in response to control signals. For example, referring to FIG. 3, a frame 118 of pixel information or data specifies pixel information or data to present an image, for example, an image of one or more virtual objects, according to one illustrated embodiment. The frame 118 is schematically illustrated with cells 120a-120m divided into horizontal rows or lines 122a-122n. Each cell 120 of the frame 118 may specify values for each of a plurality of colors for the respective pixel to which the cell 120 corresponds and/or intensities. For instance, the frame 118 may specify one or more values for red 124a, one or more values for green 124b, and one or more values for blue 124c for each pixel. The values 124 may be specified as binary representations for each of the colors, for instance, a respective 4-bit number for each color. Each cell 120 of the frame 118 may additionally include a value 124d that specifies an amplitude. Further details explaining an example of a display system 104 are provided in U.S. Provisional Patent Application Ser. No. 61/801,219, entitled "Display System and Method", which is expressly incorporated herein by reference. It should be appreciated that although the display system 104 has been described as being implemented with a scanning fiber technology, it should be appreciated that the display system 104 may be based on any display technology, e.g., liquid crystal displays (LCD), digital light processing (DLP) displays, etc.

Referring back to FIG. 3, the augmented reality system 100 further comprises one or more sensors (not shown) mounted to the frame structure 102 for detecting the position and movement of the head 54 of the end user 50 and/or the eye position and inter-ocular distance of the end user 50. Such sensor(s) may include image capture devices (such as cameras), microphones, inertial measurement units, accelerometers, compasses, GPS units, radio devices, and/or gyros).

For example, in one embodiment, the augmented reality system 100 comprises a head worn transducer system 126 that includes one or more inertial transducers to capture inertial measures indicative of movement of the head 54 of the end user 50. Such may be used to sense, measure, or collect information about the head movements of the end user 50. For instance, such may be used to detect measurement movements, speeds, acceleration, and/or positions of the head 54 of the end user 50.

The augmented reality system 100 further comprises one or more forward facing cameras 128, which may be used to capture information about the environment in which the end user 50 is located. The forward facing camera(s) 128 may be used to capture information indicative of distance and orientation of the end user 50 with respect to that environment and specific objects in that environment. When head worn, the forward facing camera(s) 128 is particularly suited to capture information indicative of distance and orientation of the head 54 of the end user 50 with respect to the environment in which the end user 50 is located and specific objects in that environment. The forward facing camera(s) 128 may, for example, be employed to detect head movement, speed, and/or acceleration of head movements. The forward facing camera(s) 128 may, for example, be employed to detect or infer a center of attention of the end user 50, for example, based at least in part on an orientation of the head 54 of the end user 50. Orientation may be detected in any direction (e.g., up/down, left, right with respect to the reference frame of the end user 50).

The augmented reality system 100 further comprises a pair of rearward facing cameras 129 to track movement, blinking, and depth of focus of the eyes 52 of the end user 50. Such eye tracking information may, for example, be discerned by projecting light at the end user's eyes, and detecting the return or reflection of at least some of that projected light. Further details discussing eye tracking devices are provided in U.S. Patent Application Ser. No. 61/801,219, entitled "Display System and Method," U.S. Patent Application Ser. No. 62/005,834, entitled "Methods and System for Creating Focal Planes in Virtual and Augmented Reality," and U.S. Patent Application Ser. No. 61/776,771, entitled "System and Method for Augmented and Virtual Reality," which are expressly incorporated herein by reference.

The augmented reality system 100 further comprises a user orientation detection module 130. The user orientation module 130 detects the instantaneous position of the head 54 of the end user 50 and may predict the position of the head 54 of the end user 50 based on position data received from the sensor(s). Significantly, detecting the instantaneous position of the head 54 of the end user 50 facilitates determination of the specific actual object that the end user 50 is looking at, thereby providing an indication of the specific textual message to be generated for that actual object and further providing an indication of the textual region in which the textual message is to be streamed. The user orientation module 130 also tracks the eyes 52 of the end user 50 based on the tracking data received from the sensor(s).

The augmented reality system 100 further comprises a control subsystem that may take any of a large variety of forms. The control subsystem includes a number of controllers, for instance one or more microcontrollers, microprocessors or central processing units (CPUs), digital signal processors, graphics processing units (GPUs), other integrated circuit controllers, such as application specific integrated circuits (ASICs), programmable gate arrays (PGAs), for instance field PGAs (FPGAs), and/or programmable logic controllers (PLUs).

In the illustrated embodiment, the augmented reality system 100 comprises a central processing unit (CPU) 132, a graphics processing unit (GPU) 134, and one or more frame buffers 136. The CPU 132 controls overall operation, while the GPU 134 renders frames (i.e., translating a three-dimensional scene into a two-dimensional image) from three-dimensional data stored in the remote data repository 150 and stores these frames in the frame buffer(s) 136. While not illustrated, one or more additional integrated circuits may control the reading into and/or reading out of frames from the frame buffer(s) 136 and operation of the scanning device of the display system 104. Reading into and/or out of the frame buffer(s) 146 may employ dynamic addressing, for instance, where frames are over-rendered. The augmented reality system 100 further comprises a read only memory (ROM) 138 and a random access memory (RAM) 140. The augmented reality system 100 further comprises a three-dimensional data base 142 from which the GPU 134 can access three-dimensional data of one or more scenes for rendering frames.

Figure 5A:
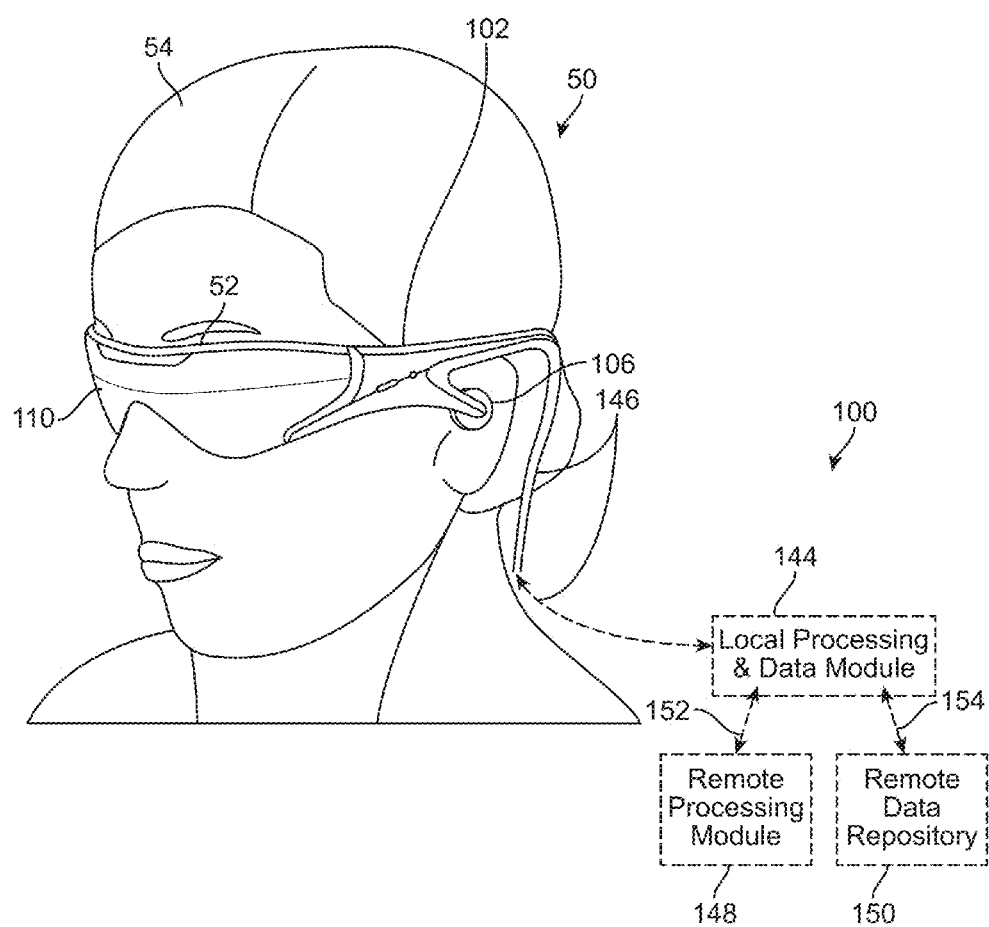
FIG. 5a is a view of one technique that can be used to wear the augmented reality system of FIG. 3.
Figure 5B:
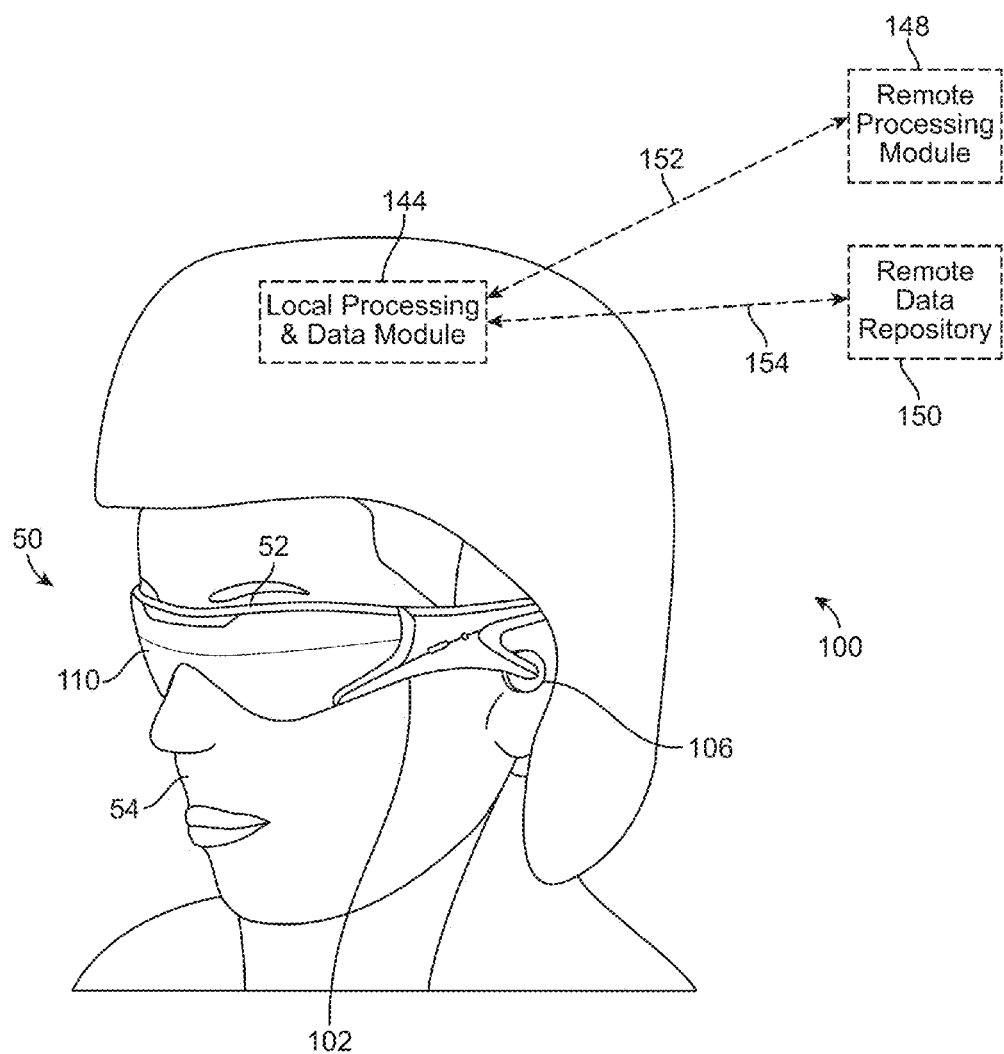
FIG. 5b is a view of another technique that can be used to wear the augmented reality system of FIG. 3.
Figure 5C:
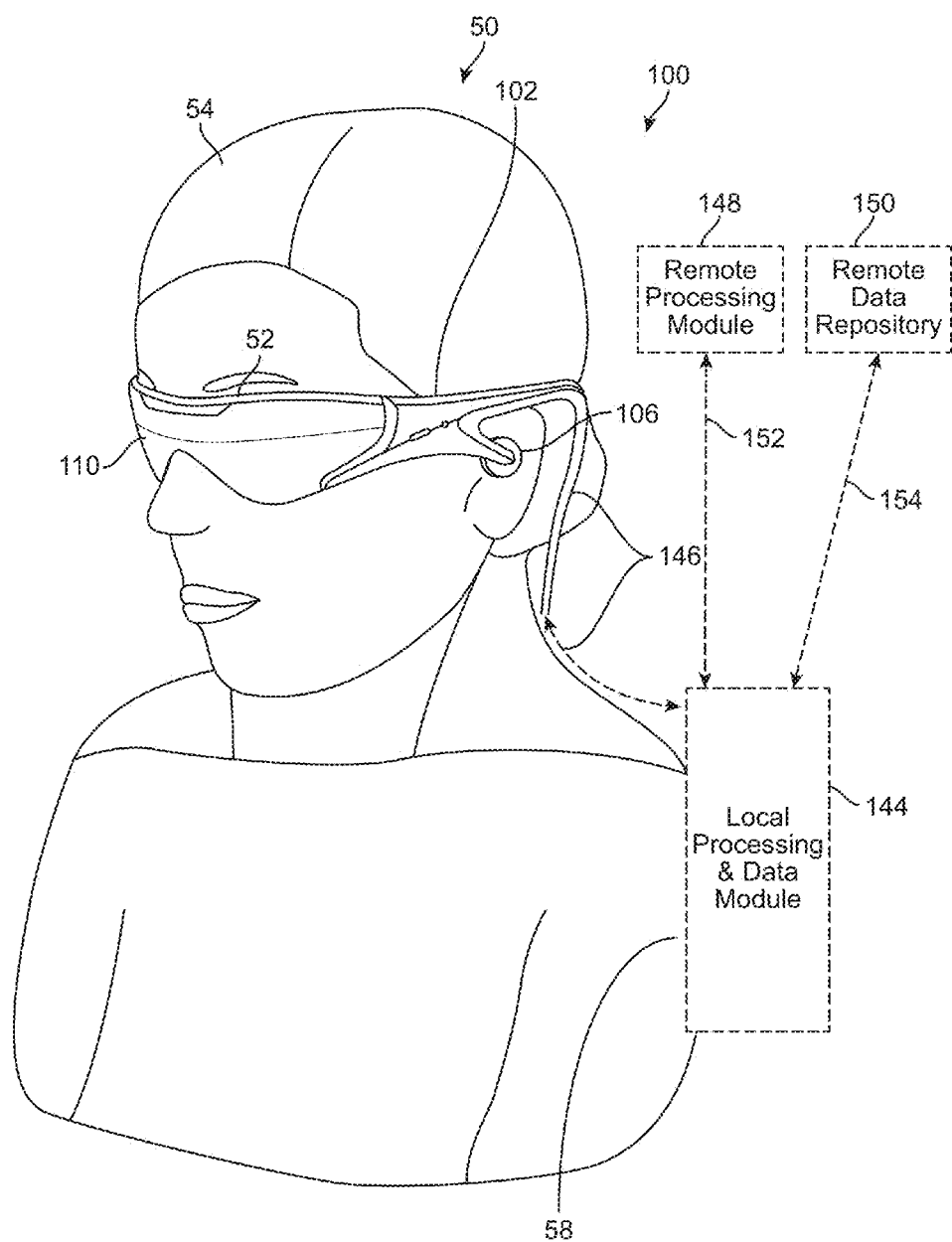
FIG. 5c is a view of still another one technique that can be used to wear the augmented reality system of FIG. 3.
Figure 5D:
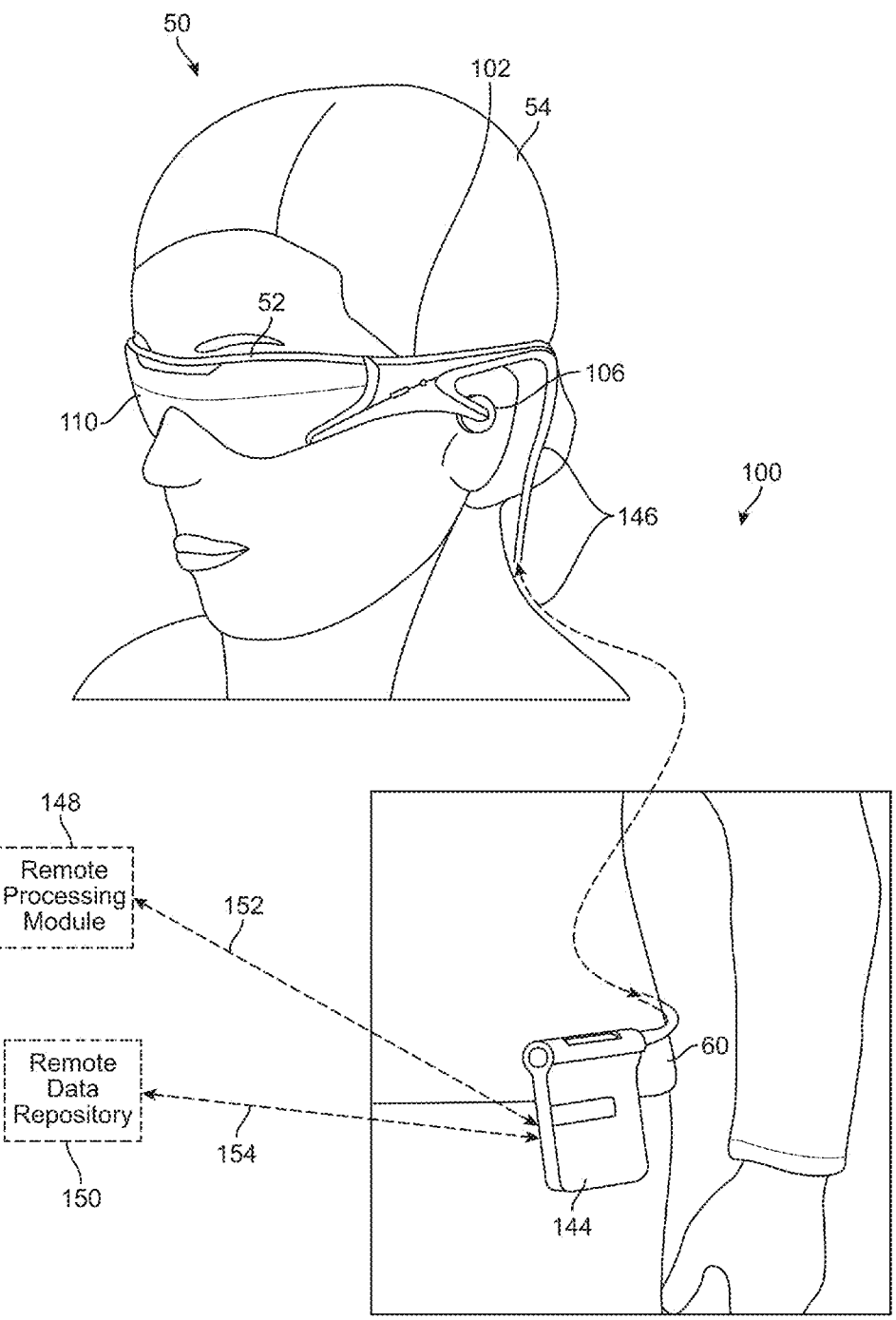
FIG. 5d is a view of yet another one technique that can be used to wear the augmented reality system of FIG. 3.

The various processing components of the augmented reality system 100 may be physically contained in a distributed system. For example, as illustrated in FIGS. 5a-5d, the augmented reality system 100 comprises a local processing and data module 144 operatively coupled, such as by a wired lead or wireless connectivity 146, to the display system 104 and sensors. The local processing and data module 144 may be mounted in a variety of configurations, such as fixedly attached to the frame structure 102 (FIG. 5a), fixedly attached to a helmet or hat 56 (FIG. 5b), embedded in headphones, removably attached to the torso 58 of the end user 50 (FIG. 5c), or removably attached to the hip 60 of the end user 50 in a belt-coupling style configuration (FIG. 5d). The augmented reality system 100 further comprises a remote processing module 148 and remote data repository 150 operatively coupled, such as by a wired lead or wireless connectivity 150, 152, to the local processing and data module 144, such that these remote modules 148, 150 are operatively coupled to each other and available as resources to the local processing and data module 144.

The local processing and data module 144 may comprise a power-efficient processor or controller, as well as digital memory, such as flash memory, both of which may be utilized to assist in the processing, caching, and storage of data captured from the sensors and/or acquired and/or processed using the remote processing module 148 and/or remote data repository 150, possibly for passage to the display system 104 after such processing or retrieval. The remote processing module 148 may comprise one or more relatively powerful processors or controllers configured to analyze and process data and/or image information. The remote data repository 150 may comprise a relatively large-scale digital data storage facility, which may be available through the internet or other networking configuration in a "cloud" resource configuration. In one embodiment, all data is stored and all computation is performed in the local processing and data module 144, allowing fully autonomous use from any remote modules.

The couplings 146, 152, 154 between the various components described above may include one or more wired interfaces or ports for providing wires or optical communications, or one or more wireless interfaces or ports, such as via RF, microwave, and IR for providing wireless communications. In some implementations, all communications may be wired, while in other implementations all communications may be wireless. In still further implementations, the choice of wired and wireless communications may be different from that illustrated in FIGS. 5a-5d. Thus, the particular choice of wired or wireless communications should not be considered limiting.

In the illustrated embodiment, the user orientation module 130 is contained in the local processing and data module 144, while CPU 132 and GPU 134 are contained in the remote processing module 148, although in alternative embodiments, the CPU 132, GPU 124, or portions thereof may be contained in the local processing and data module 144. The 3D database 142 can be associated with the remote data repository 150.

Figure 6A:
FIGS. 6a-6c are plan views of a coffee menu, wherein the augmented reality system of FIG. 3 streams a textual message within a text region adjacent an object of interest in accordance with one technique of the present inventions.
Figure 6A:
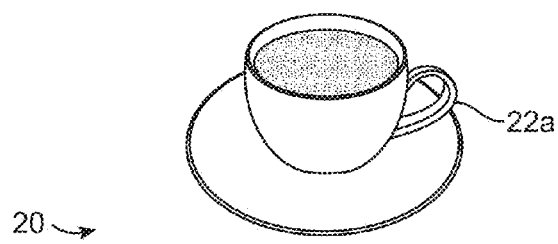
Figure 6A:
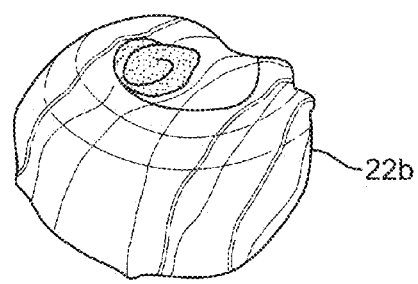
Figure 6A:
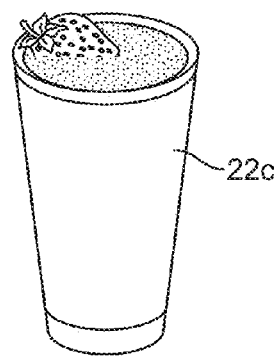
Figure 6B:
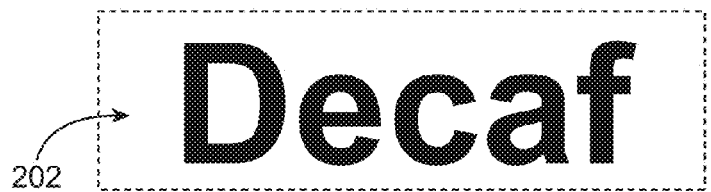
Figure 6B:
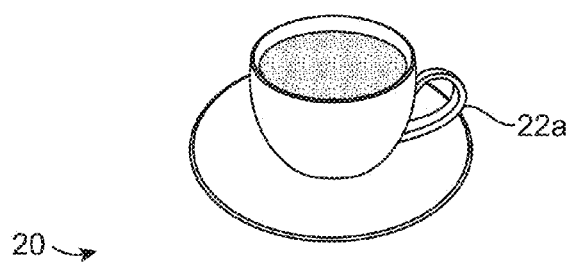
Figure 6B:
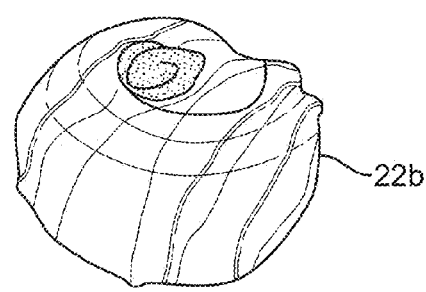
Figure 6B:
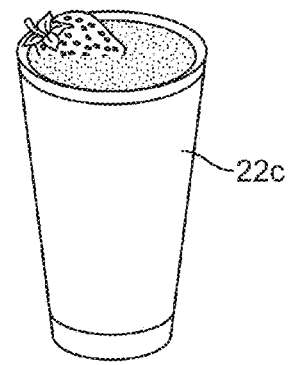

As briefly discussed above, the augmented reality system 100 spatially associates a text region adjacent one of the actual objects, generates a textual message that identifies at least one characteristic of the actual object, and streams the textual message within the text region. For example, referring to FIGS. 6a-6c, a text region 200 may be spatially associated with an object of interest, and in this case, the cup of coffee 20a, e.g., a cup of coffee that may be physical or may be a picture on a menu. In the illustrated embodiment, the text region 200 takes the form of a rectangular box located immediately above the object of interest 20a, although in alternative embodiments, the text region 200 may take any suitable shape. In the illustrated embodiment, the text region 200 is visible to the end user 50. Alternatively, the text region 200 may be invisible to the end user 50. In one embodiment, the text region 200 is linked to the object of interest 20a, such that the text region 200 moves in coordination with movement of the object of interest 20a (e.g., the menu is moved). That is, if the object of interest 20a moves within the three-dimensional scene, the text region 200 will move with the object of interest 20a.

Figure 6C:
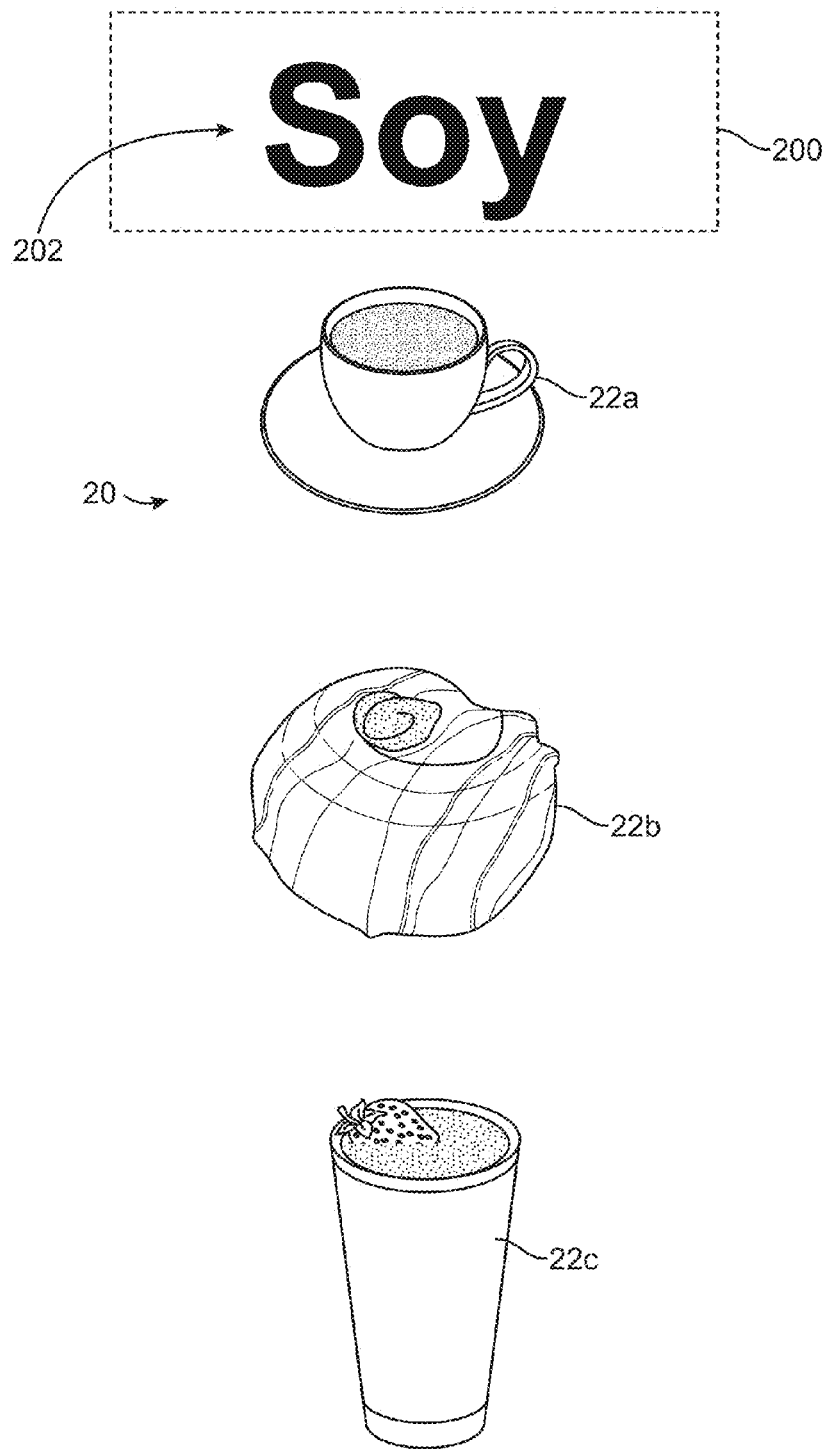

The augmented reality system 100 streams a textual message 202, e.g., "coffee, decaf, soy," in the text region 200. As there shown, the textual message 202 is streamed, such that the word "coffee" is first displayed in the text region 200 (FIG. 6a), then the word "decaf" is displayed in the text region 200 (FIG. 6b), and lastly the word "soy" is displayed in the text region 200 (FIG. 6c). The textual message 202 can be streamed in a continuous loop, such that the words "coffee," "decaf," and "soy" are repeatedly displayed in series in the text region 200 (i.e., "coffee," "decaf," "soy," "coffee," "decaf," "soy," etc.).

Figure 7A:
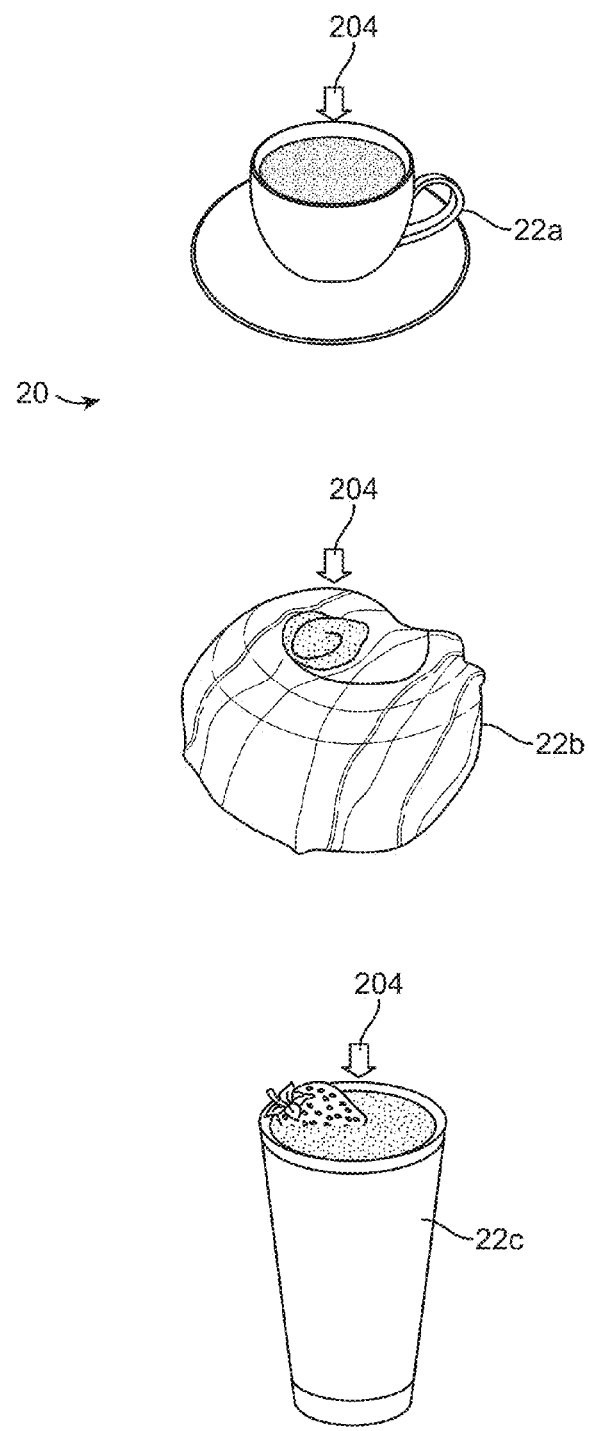
FIGS. 7a-7b are plan views of a coffee menu, wherein the augmented reality system of FIG. 3 activates the text region adjacent the object of interest.
Figure 7B:
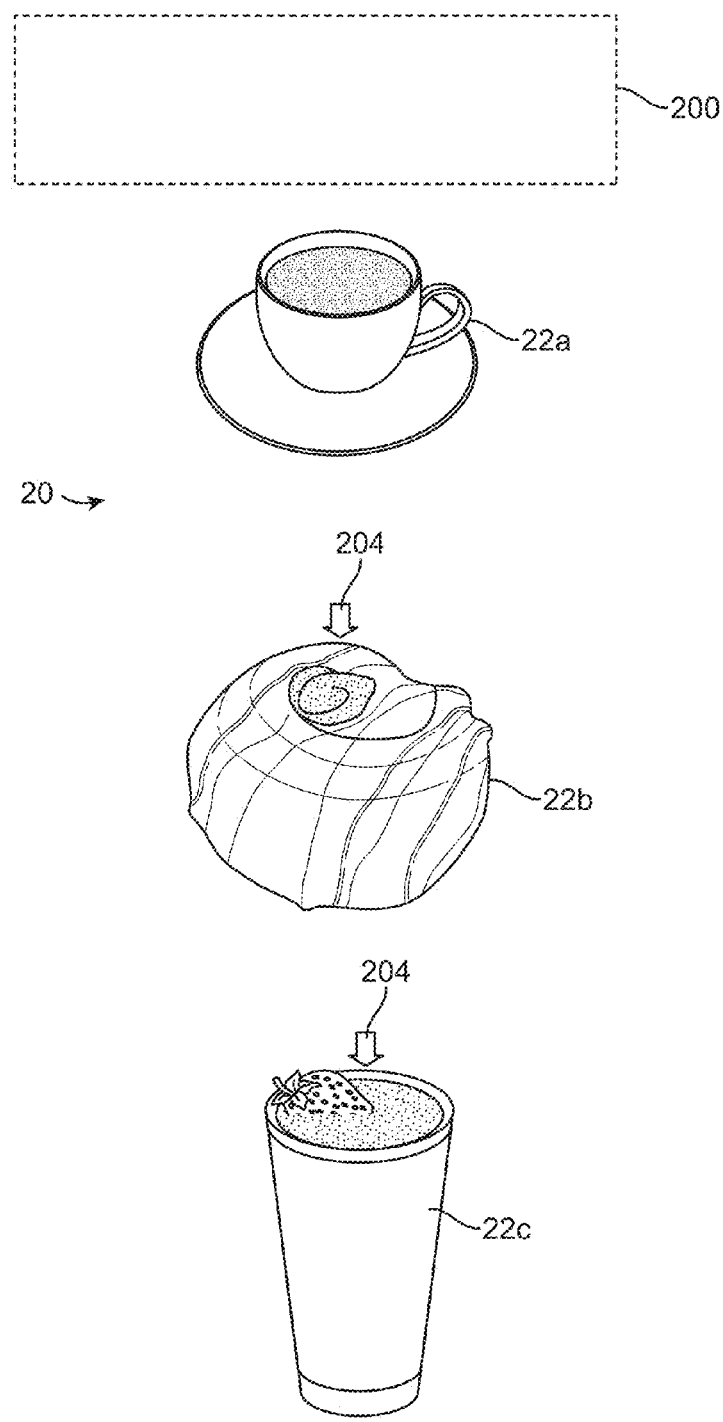

In an optional embodiment, the text region 200 may be selectively activated by the end user 50. In particular, the text region 200 may be in a default inactive state, wherein it is invisible to the end user, and then activated to allow the text region 200 to be viewed by the end user 50. For example, as illustrated in FIGS. 7a-7b, the augmented reality system 100 may display a text region indicator 204 (in this case, an arrow) adjacent the objects of interest 20a-20c (FIG. 7a), sense a focal point of the end user 50, and activate the text region 200 when the focal point of the end user 50 is coincident with the text region indicator 204 (in this case, when the end user 50 is focused on the object of interest 20a) (FIG. 7b).

Although the textual message 202 is described as being displayed one word at a time, it should be appreciated that the textual message 202 can be displayed more than one word at a time. For example, this may be useful when more than two adjacent words in the textual message 202 are short enough, such that they can be simultaneously displayed together in the text region 200.

Although the textual message 202 has been described as being streamed within the text region 200 in a manner such that at least one of the words in the textual message 202 cannot be seen by the end user 50, the textual message 202 may be streamed within the text region 200, such that at least two of the words are displayed at a time, but only one of the displayed words is emphasized.

Figure 8A:
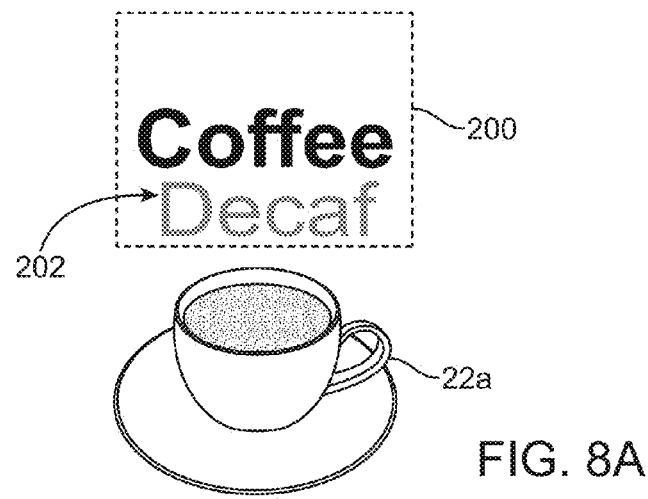
FIGS. 8a-8c are plan views of an object of interest on the coffee menu, wherein the augmented reality system of FIG. 3 streams a textual message within a text region adjacent an object of interest in accordance with another technique of the present inventions.
Figure 8B:
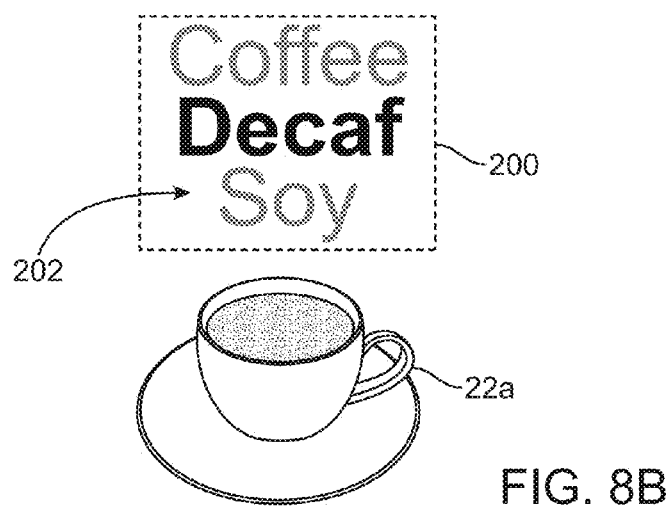
Figure 8C:
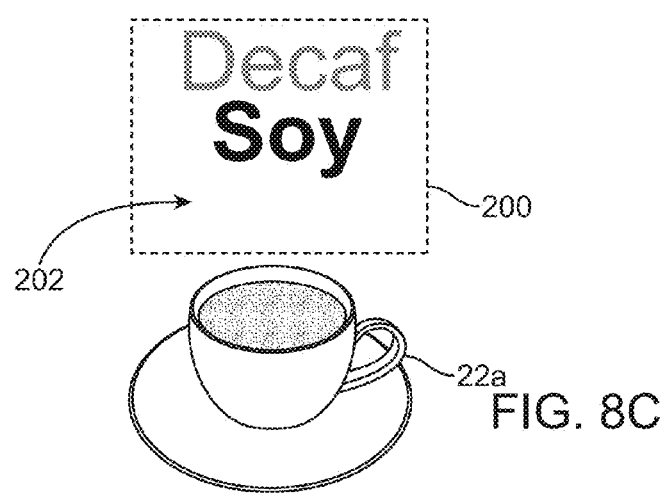

For example, two or more words of the textual message 202 may be simultaneously displayed, while emphasizing one of the words by displaying it with a brightness intensity more than the other currently displayed words. For example, as shown in FIGS. 8a-8c, the words "coffee" and "decaf" can first be displayed one above the other in the text region 200, with the word "coffee" being emphasized with a relatively high brightness intensity, and the word "decaf" being deem phasized with a relatively low brightness intensity (FIG. 8a); the words "coffee," "decaf," and "soy" can then be displayed one above the other in the text region 200, with the word "decaf" being emphasized with a relatively high brightness intensity, and the words "coffee" and "soy" being deemphasized with a relatively low brightness intensity (FIG. 8b); and the words "decaf" and "soy" can then be displayed one above the other in the text region 200, with the word "soy" being emphasized with a relatively high brightness intensity, and the word "decaf" being deem phasized with a relatively low brightness intensity (FIG. 8c).

Figure 9A:
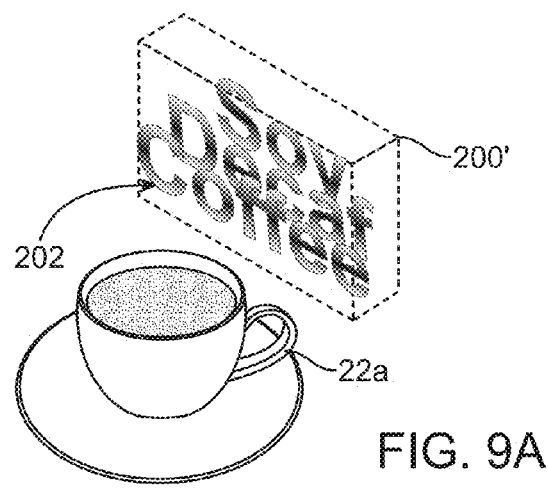
FIGS. 9a-9c are plan views of an object of interest on the coffee menu, wherein the augmented reality system of FIG. 3 streams a textual message within a text region adjacent an object of interest in accordance with still another technique of the present inventions.
Figure 9B:
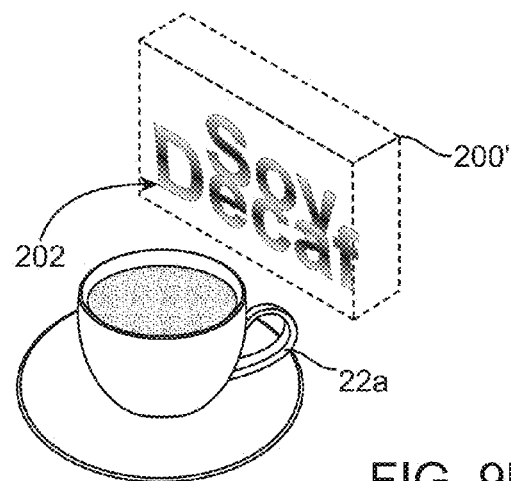
Figure 9C:
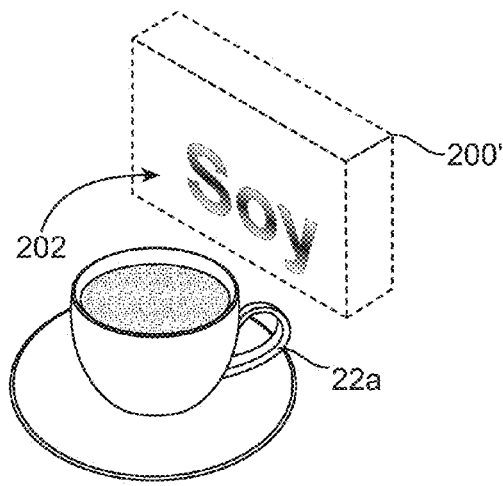

As another example, a three-dimensional text region may be spatially associated with the object of interest 20a, in which case, one of the words in the textual message 202 may be emphasized by displaying it in the foreground of the text region 200', and another word or words of the textual message 202 may be deemphasized by displaying it in the background of text region 200'. For example, as shown in FIGS. 9a-9c, the words "coffee," "decaf," and "soy" can first be displayed one behind the other in the text region 200', with the word "coffee" being emphasized by displaying it the foreground, and the words "decaf" and "soy" being deemphasized by displaying them in the background (FIG. 9a); the words "decaf" and "soy" are then displayed one behind the other in the text region 200', with the word "decaf" being emphasized by displaying it in the foreground, and the word "soy" being deemphasized by displaying it in the background (FIG. 9b); and the word "soy" is then displayed alone in the text region 200' (FIG. 9c).

Figure 10A:
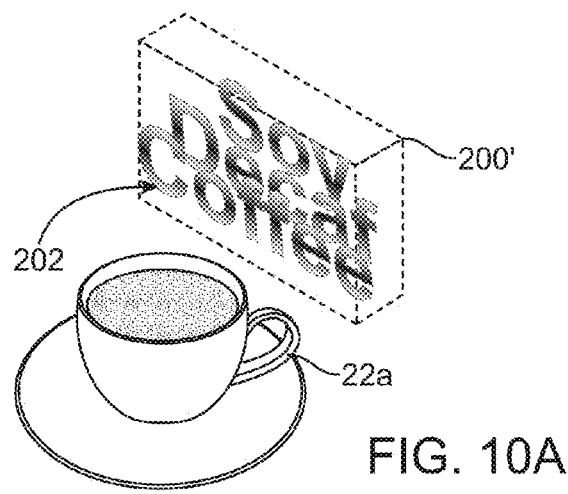
FIGS. 10a-10c are plan views of a coffee menu, wherein the augmented reality system of FIG. 3 streams a textual message within a text region adjacent an object of interest in accordance with yet another technique of the present inventions.
Figure 10B:
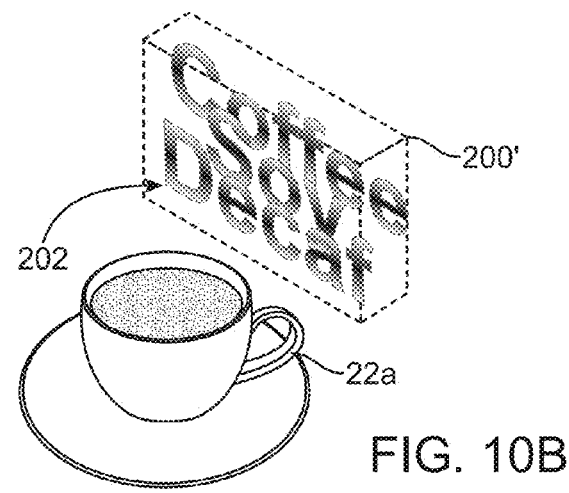
Figure 10C:
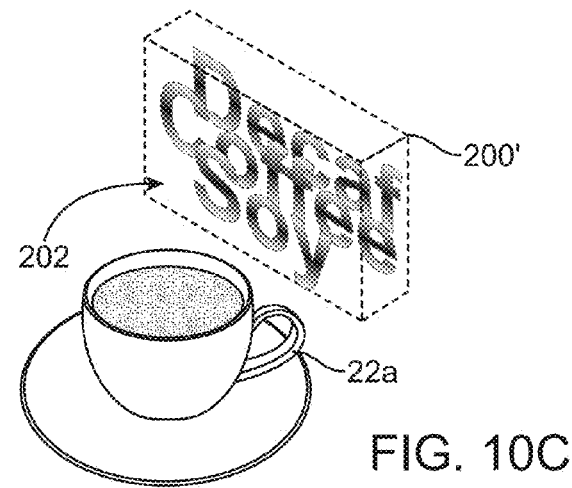

The textual message 202 can alternatively be streamed in a continuous loop, such that the words "coffee," "decaf," and "soy" are repeatedly displayed in series in the text region 200'. In this case, as shown in FIGS. 10a-10c, the words "coffee," "decaf," and "soy" can first be displayed one behind the other in the text region 200', with the word "coffee" being emphasized by displaying it the foreground, and the words "decaf" and "soy" being deemphasized by displaying them in the background (FIG. 10a); the words "decaf," "soy," and "coffee" are then displayed one behind the other in the text region 200', with the word "decaf" being emphasized by displaying it in the foreground, and the words "soy" and "coffee" being deem phasized by displaying them in the background (FIG. 10b); and the words "soy," "coffee," and "decaf" are then displayed one behind the other in the text region 200', with the word "soy" being emphasized by displaying it in the foreground, and the words "coffee" and "soy" being deem phasized by displaying them in the background (FIG. 10c).

Notably, the reordering of the words of the textual message 202 in the text region 200' may be performed discretely (i.e., the words discretely appear and disappear from the ordered sequence) or may be performed continuously (i.e., the words continuously move from the background into the foreground). Furthermore, while words of the textual message 202 have been described as being emphasized or de-emphasized in a text region by displaying the words of the textual message 202 with different brightness intensities or at different depths, the words of the textual message 202 may be emphasized or de-emphasized by displaying one of the words with bigger letters than those of the remaining words of the textual message 202 or displaying one of the words as being solid or opaque and the remaining words of the textual message 202 as being transparent or translucent.

Figure 11A:
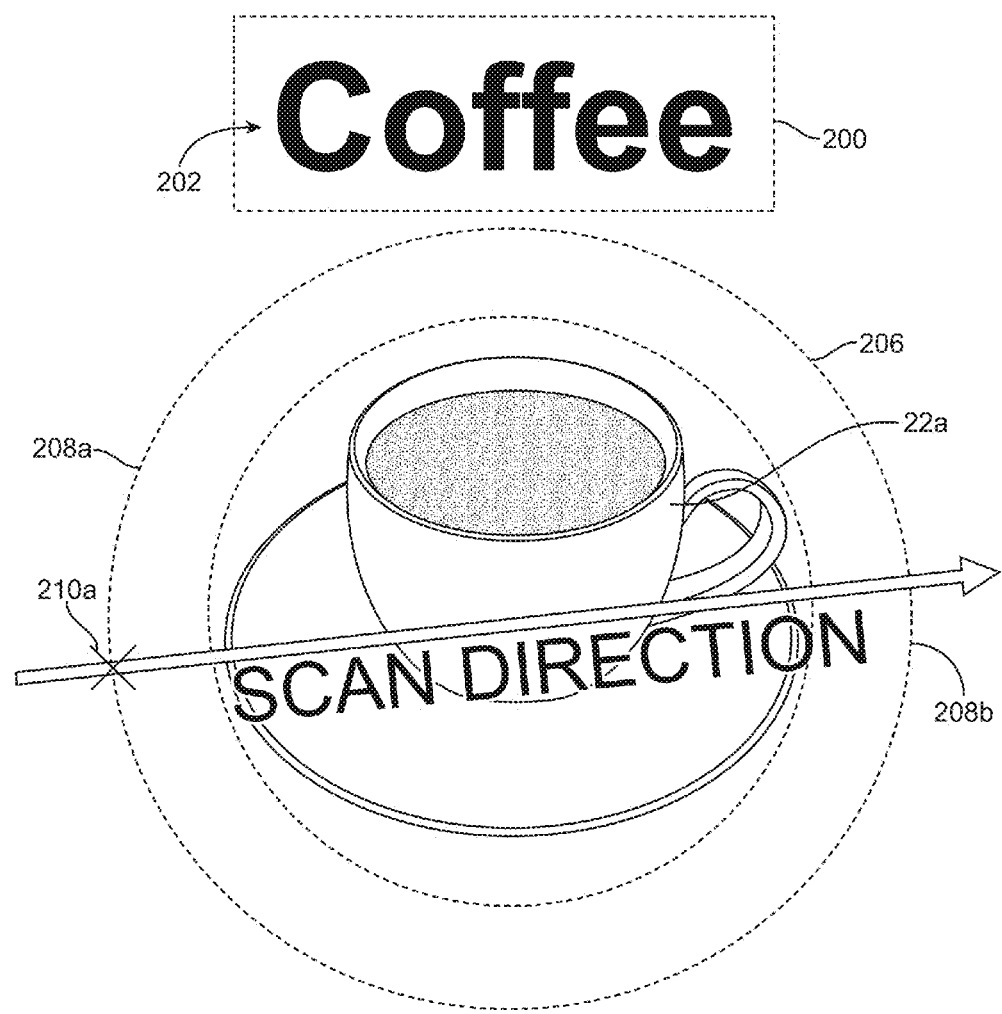
FIGS. 11a-11b are plan views of a coffee menu, wherein the augmented reality system of FIG. 3 controls the streaming of the textual message in response to head movements by the end user in accordance with one technique of the present inventions.
Figure 11B:
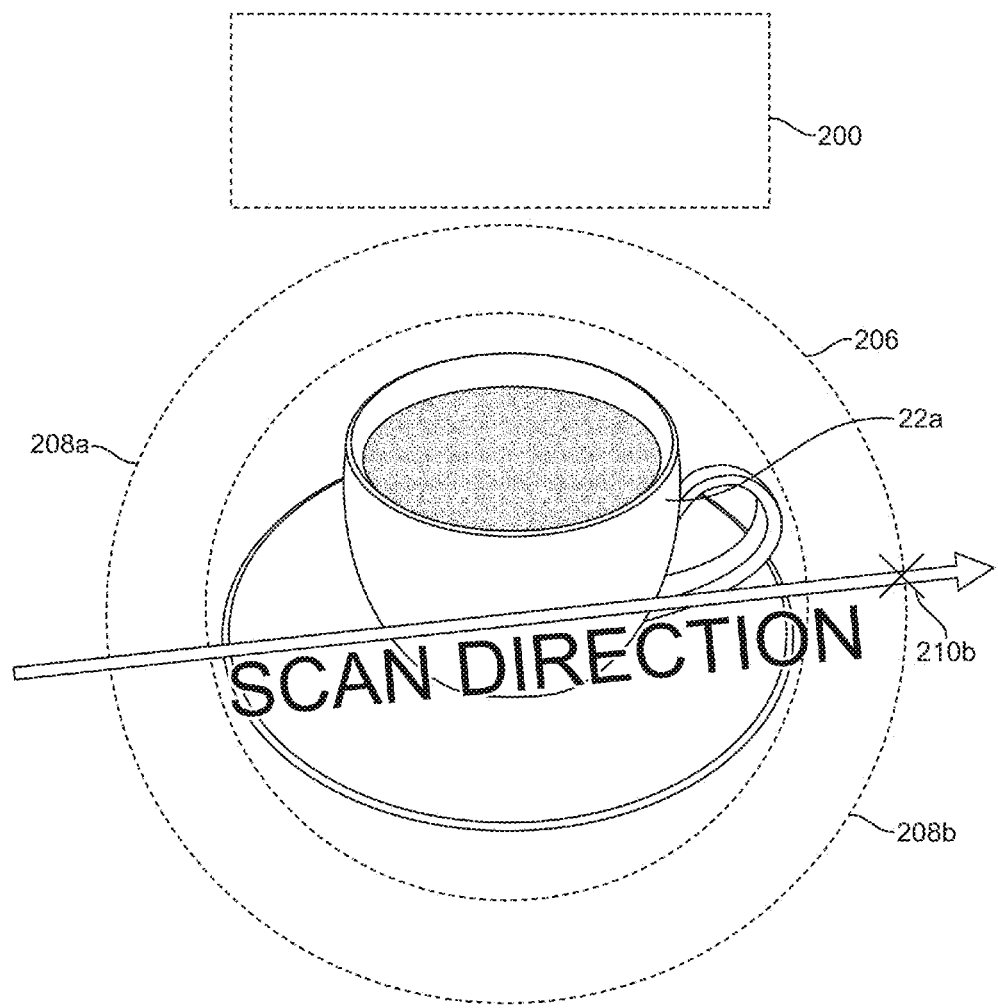

Referring to FIG. 11*a*-11*b*, the augmented reality system 100 displays a gesture reference object 206 adjacent the object of interest 20*a* that allows a gestural command from the end user 50 to be sensed. In particular, the angular position of an anatomical part of the end user 50 relative to the gesture reference object 206 is sensed. In the illustrated embodiment, the anatomical part of the end user 50 that gestures is the head 54 of the end user 50, and thus, the direction in which the head 54 of the end user 50 is pointed relative to the gesture reference object 206 is sensed. In alternative embodiments, a gesture reference object 206 is not displayed to the end user 50, but rather an invisible gesture reference is incorporated into the same coordinate system as the object of interest 20*a*. In this case, the direction in which the head 54 of the end user 50 is pointed relative to the gesture reference is sensed.

In the illustrated embodiment, the gesture reference object 206 takes the form of an annular ring that completely encircles the object of interest 20*a*. Pointing the head 54 of the end user 50 at a portion of the annular ring 206 controls the streaming of the textual message 202. For example, when the end user 50 scans his or her head 54 across the annular ring 206, streaming of the textual message 202 may be initiated when the head 54 is pointed at one side 208*a* of the annular ring 206; e.g., the point 110*a* on the left side 208*a* of the annular ring 206 (FIG. 11*a*), and terminated when the head 54 is pointed at the opposite side of the annular ring 206; e.g., the point 110*b* on the right side 208*b* of the annular ring 206 (FIG. 11*b*). It should be appreciated that although the scan direction is illustrated in FIGS. 11*a*-11*b* as being left to right, the scan can be similarly applied to the annular ring 206 with different directions (including, top to bottom, bottom to top, and right to left) to initiate and then cease streaming of the textual message 202.

Figure 12A:
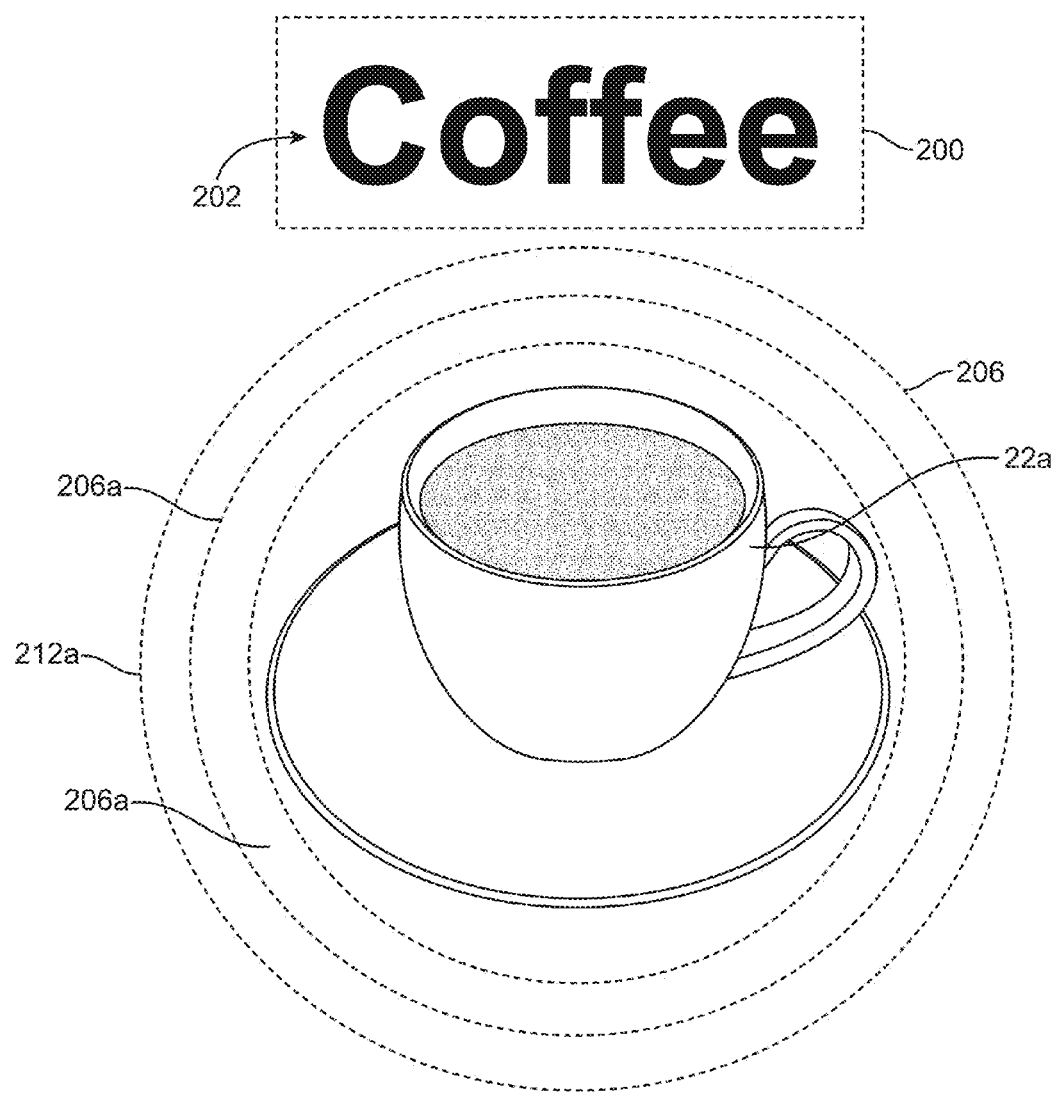
FIGS. 12a-12c are plan views of a coffee menu, wherein the augmented reality system of FIG. 3 controls the streaming of the textual message in response to head movements by the end user in accordance with another technique of the present inventions.
Figure 12B:
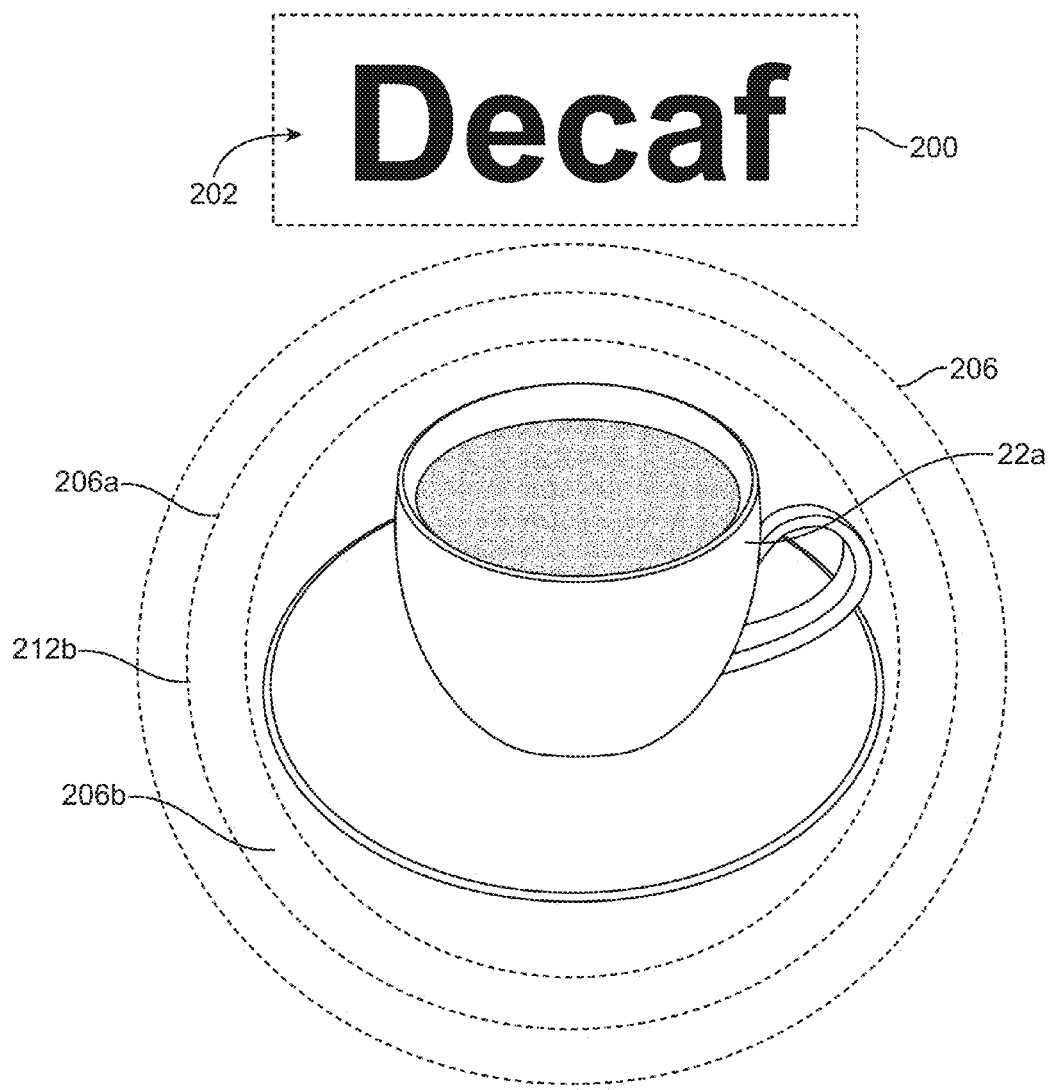
Figure 12C:
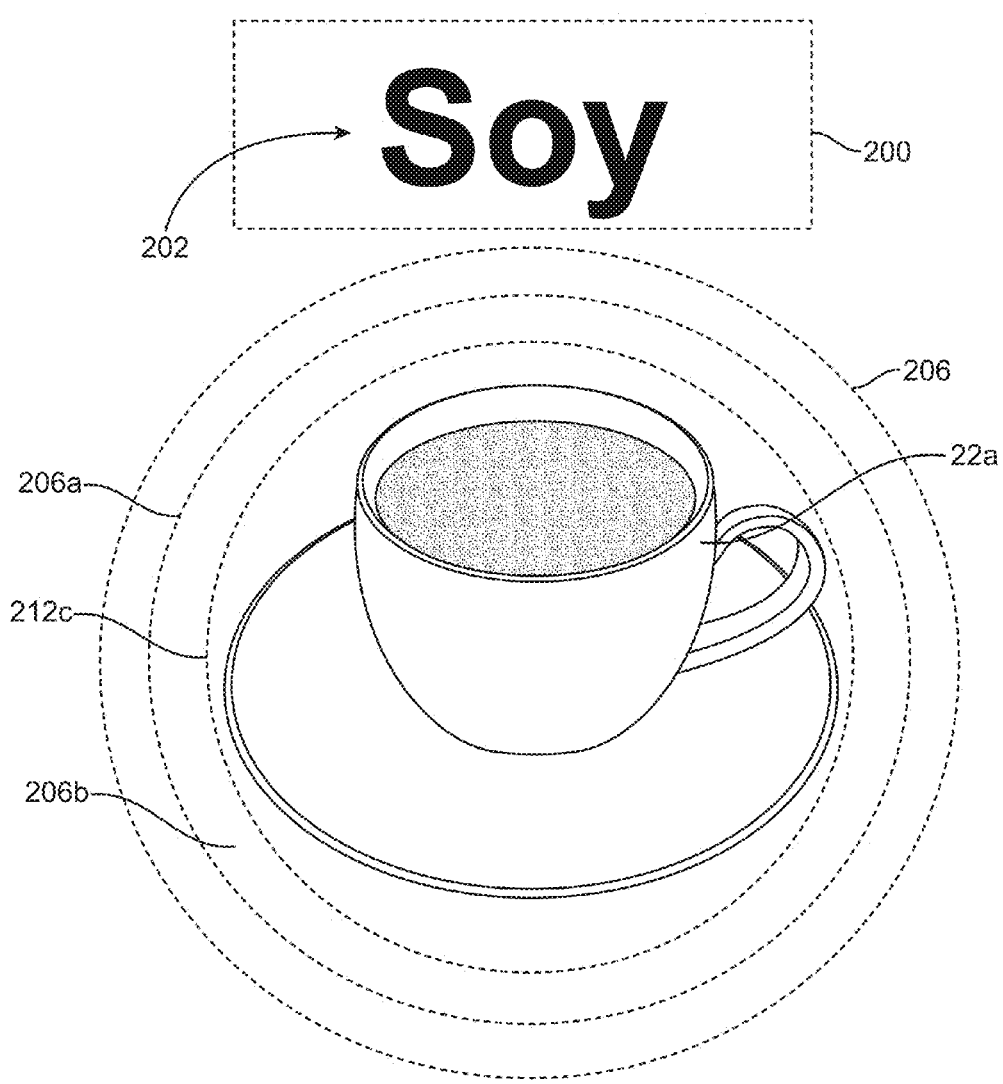

As another example, when the end user 50 scans his or her head across the annular ring 206, the timing of each word in the textual message 202 may be controlled. For example, as shown in FIG. 12*a*-12*c*, the annular ring 206 can be divided into a plurality of concentric rings, and in this case, two concentric rings 206*a*, 206*b*. When the end user 50 scans his or her head 54 from the outside to the inside of the annular ring 206, as the head 54 scans across the outer edge 210*a* of the annular ring 206, the word "coffee" will be displayed in the text region 200 (FIG. 12*a*); as the head 54 scans across the interface 210*b* between the concentric rings 206*a*, 206*b*, the word "decaf" will be displayed in the text region 200 (FIG. 12*b*); and as the head 54 scans across the inner edge 210*c* of the annular ring 206, the word "soy" will be displayed in the text region 200 (FIG. 12*c*).

In contrast, when the end user 50 scans his or her head 54 from the inside to the outside of the annular ring 206, as the head 54 scans across the inner edge 210*c* of the annular ring 206, the word "soy" will be displayed in the text region 200 (FIG. 12*c*); as the head 54 scans across the interface 210*b* between the concentric rings 206*a*, 206*b*, the word "decaf" will be displayed in the text region 200 (FIG. 12*b*); and as the head 54 scans across the outer edge 210*a* of the annular ring 206, the word "coffee" will be displayed in the text region 200 (FIG. 12*a*).

It can be appreciated that the annular ring 206 can be divided into further concentric rings if the number of words in the textual message is greater than three or may not be divided at all if the number of words in the textual message equals two (i.e., the inner and outer edges of the annular ring 206 will respectively trigger the display of the two words). It can also be appreciated that scanning the head 54 from the outside to the inside of the annular ring 206 streams the textual message 202 forward, and scanning the head 54 from the inside to the outside of the annular ring 206 streams the textual message 202 in reverse. It can also be appreciated that the streaming speed of the textual message 202 is increased by scanning the head 54 across the annular ring 206 relatively quickly, and decreased by scanning the head 54 across the annular ring 206 relatively slowly. In the illustrated embodiment, the streaming speed adjustment is a function of the head 54 scanning across the edges 210*a*, 210*c* and interface 214*b* that trigger the display of the different words of the textual message 202. Alternatively, irrespective of whether or not the annular ring 206 includes concentric rings, the streaming speed adjustment can simply be a function of the speed at which the head 54 scans the annular ring 206. For example, with reference back to FIGS. 11*a*-11*b*, scanning the head 54 across the left side of the annular ring 206 quickly will cause the textual message 202 to be streamed relatively quickly, and scanning the head 54 across the left side of the annular ring 206 slowly will cause the textual message 202 to be streamed relatively slowly.

It should be noted that although the gesture reference object 206 in the illustrated embodiment is separate and distinct from the object of interest 20*a*, in alternative embodiments, the gesture reference object 206 can be the actual object, itself. Although in the illustrated embodiment, the gestural command is performed by the head 54 of the end user 50, it should be appreciated that other anatomical parts of the end user 50 can be used to issue a command; for example, the direction that the finger or hand of the end user 50 is pointed relative to the annular ring 206 may be sensed.

The augmented reality system 100 may facilitate the reading and comprehension of the streaming textual message in any one of a variety manners. In one embodiment, for textual messages with a relatively large number of words, the augmented reality system 100 may vary the pauses between the words of the textual message, such that some pairs of adjacent words have relatively short pauses between them, and other adjacent pairs of words have relatively long pauses between them. For example, the textual message may be divided into five-word groups, with relatively short pauses being placed between words in each group, and relatively long pauses being placed between the five-word groups.

In another embodiment, the augmented reality system 100 may sense blinking of the eyes 52 of the end user 50, such that streaming of the textual message 202 pauses when the eyes 52 of the end user 50 are closed, and continues when the eyes 52 of the end user 50 are opened. In still another embodiment, the augmented reality system 100 adjusts the streaming speed of the textual message based on the distance between the end user 50 and the actual object at which the end user 50 is looking. For example, the focal plane in which the actual object is disposed may be identified, and the streaming speed of the textual message may be set to be relatively fast if the focal plane is relatively close to the end user 50, and set to be relatively slow if the focal plane is relatively far from the end user 50. In yet another embodiment, the augmented reality system 100 generates a pattern of audible tones (which may differ or be the same amongst each other) that respectively correspond temporally with the words in the textual message as they are streamed. For example, as each word is displayed to the end user 50, the augmented reality system 100 generates and transmits an audible tone to the end user 50.

Having described the structure and function of the augmented reality system 100, one method 300 performed by the augmented reality system 100 to steam textual messages to the end user 50 will now be described with respect to FIG. 13. First, the augmented reality system 100 allows the end user 50 to visualize the three-dimensional scene in an ambient environment, e.g., a coffee shop (step 302). This can be accomplished, e.g., in a "video see-through" display, in which the CPU 132 directs the forward facing cameras 128 to capture image data of the three-dimensional scene, and directs the display system 104 to display the captured image data to the end user 50; or an "optical see-through" display, in which the end user is simply allowed to view directly the light from the three-dimensional scene.

The CPU 132 also instructs the GPU 134 to generate virtual image data from the point of the view of the end user 50, and in this embodiment, rendering two-dimensional virtual image data from a three-dimensional virtual scene (step 304). In one embodiment, the virtual image data may be generated based on predictive head positions in order to minimize any latency issues, e.g., by rendering and warping the virtual image data in the manner described in U.S. Patent Application Ser. No. 62/304,418, entitled "Wide Baseline Stereo for Low-Latency Render", which is expressly incorporated herein by reference.

The CPU 132 then instructs the display system 104 to display the virtual image data as a virtual image to the end user 50 that, along with the ambient three-dimensional scene, creates a three-dimensional augmented scene (step 306). The CPU 132 also instructs the display system 104 to display text region indicators 204 adjacent selected ones of the objects of interest 22 in the three-dimensional augmented scene (step 308). The CPU 132 then senses the focal point of the end user 50 via the via the user orientation detection module 130 (step 310), and, when the focal point of the end user 50 is coincident with one of the text region indicators 204, activates the text region 200 corresponding to that one text region indicator 204 by instructing the display system 104 to display the text region 200 adjacent the corresponding object of interest 20a (step 312).

Next, the CPU 132 associates a gesture reference with the object of interest 20a corresponding to the activated text region 200 (step 314), and optionally instructs the display system 104 to display the gesture reference as a gesture reference object 206 adjacent the object of interest 20a (step 316). The CPU 132 then detects the angular position of the head 54 of the end user 50 relative to gesture reference object 206 via the user orientation detection module 130 (step 318). When the head 54 of the end user 50 is pointed at the gesture reference object 206, the CPU 132 then generates the particular textual message 202 associated with the object of interest 20a corresponding to the activated text region 200 (step 320), and instructs the display system 104 to initiate streaming of the textual message 202 within the activated text region 200 (step 322). Optionally, the CPU 132 identifies a focal plane in which the object of interest 20a is disposed via the user orientation detection module 130 (step 324), and adjusts the streaming speed of the textual message based on the identified focal plane (e.g., the farther the focal plane is from the end user 50, the slower the streaming speed, and the shorter the focal plane is from the end user 50, the faster the streaming speed) (step 326).

The CPU 132 then detects angular position/velocity of the head 54 of the end user 50 relative to the gesture reference object 206 (e.g., where the head 54 is pointed on the gesture reference object 206 or how quickly the head 54 scans the gesture reference object 206) via the user orientation detection module 130 (step 328). The CPU 132 controls the streaming of the textual message 202 (e.g., speed, forward/reverse, etc.) based on the detected angular position/velocity of the head 54 of the end user 50 (step 330). The CPU 132 detects blinking of the eyes 52 of the end user 50 via the user orientation detection module 130 (step 332), and pauses streaming of the textual message 202 when the eyes 52 are closed, and continues streaming of the textual message 202 when the eyes 52 are opened (step 334).

Although the generating and streaming of a textual message has been described in the context of an augmented reality system, it should be appreciated that the textual message may be streamed adjacent an actual object of interest with or without displaying virtual objects. For example, a system can simply be used to stream textual messages adjacent actual objects of interest in an ambient three-dimensional scene. It should also be appreciated that although the textual messages have been described herein as being streamed in the context of simply providing labeling of objects of interest using the most brief amount of text, textual messages can also be used in virtual image generation systems to medium text use (e.g., infographic paragraph) and long text use (e.g., book chapter) cases.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method of operating a virtual image generation system, the method comprising:
   allowing an end user to visualize an object of interest in a three-dimensional scene;
   spatially associating a text region within a field of view of the user, wherein the text region is spatially associated with the object of interest;
   generating a gesture reference associated with the object of interest;
   generating a textual message that identifies at least one characteristic of the object of interest;
   streaming the textual message within the text region;
   sensing gestural commands from the end user by detecting an angular position of an anatomical part of the end user relative to a plurality of different regions of the gesture reference; and
   controlling the streaming of the textual message in response to the sensed gestural commands, wherein the gesture reference is an annular ring surrounding the object of interest, and
   wherein a first side of the annular ring forms one of the different regions, and
   a second side of the annular ring opposite of the first side of the annular ring forms another one of the different regions.

2. The method of claim 1, further comprising displaying the gesture reference as a gesture reference object adjacent the object of interest.

3. The method of claim 1, wherein the anatomical part of the end user is a head of the end user.

4. The method of claim 3, wherein the anatomical part of the end user is a finger or hand of the end user.

5. The method of claim 1, wherein the gesture reference is separate and distinct from the object of interest.

6. The method of claim 1, wherein the annular ring comprises a plurality of concentric rings, and an interface between two adjacent ones of the concentric rings forms one of the different regions.

7. The method of claim 6, wherein an inner or outer edge of the annular ring forms another one of the different regions.

8. The method of claim 1, wherein the gesture reference is the object of interest.

9. The method of claim 1, wherein the streaming of the textual message is controlled in response to the sensed gestural commands by initiating the streaming of the textual message when the anatomical part of the end user is pointed at the one region of the gesture reference, and terminating the streaming of the textual message when the anatomical part of the end user is pointed at another different region of the gesture reference.

10. The method of claim 1, wherein the streaming of the textual message is controlled in response to the sensed gestural commands by displaying at least one word of the textual message when the anatomical part of the end user is pointed at the one region of the gesture reference, and displaying at least another word of the textual message when the anatomical part of the end user is pointed at another different region of the gesture reference.

11. The method of claim 1, wherein the gestural commands are sensed from the end user as the anatomical part of the end user is scanned across the gesture reference.

12. The method of claim 1, wherein the one or more sensors are configured for sending the gestural commands from the end user as the anatomical part of the end user is scanned across the gesture reference.

13. A virtual image generation system for use by an end user, comprising: a display system configured for allowing the end user to visualize an object of interest in a three dimensional scene;
a control system configured for spatially associating a text region with a field of view of the end user, wherein the text region is spatially associated with the object of interest,
generating a gesture reference associated with the object of interest,
generating a textual message that identifies at least one characteristic of the object of interest, and
instructing the display system to stream the textual message within the text region; and
one or more sensors configured for sensing gestural commands from the end user by detecting an angular position of an anatomical part of the end user relative to a plurality of different regions of the gesture reference, wherein the control system is further configured for controlling the streaming of the textual message in response to the sensed gestural commands,
wherein the gesture reference is an annular ring surrounding the object of interest, and
wherein a first side of the annular ring forms one of the different regions, and
a second side of the annular ring opposite of the first side of the annular ring forms another one of the different regions.

14. The virtual image generation system of claim 13, wherein the control system is further configured for instructing the display system to display the gesture reference as a gesture reference object adjacent the object of interest.

15. The virtual image generation system of claim 13, wherein the anatomical part of the end user is a head of the end user.

16. The virtual image generation system of claim 15, wherein the anatomical part of the end user is a finger or hand of the end user.

17. The virtual image generation system of claim 13, wherein the gesture reference is separate and distinct from the object of interest.

18. The virtual image generation system of claim 13, wherein the annular ring comprises a plurality of concentric rings, and an interface between two adjacent ones of the concentric rings forms one of the different regions.

19. The virtual image generation system of claim 18, wherein an inner or outer edge of the annular ring forms another one of the different regions.

20. The virtual image generation system of claim 19, wherein the gesture reference is the object of interest.

21. The virtual image generation system of claim 13, wherein the control system is configured for controlling the streaming of the textual message in
response to the sensed gestural commands by instructing the display system to initiate the streaming of the textual message when the anatomical part of the end user is pointed at the one region of the gesture reference, and terminate the streaming of the textual message when the anatomical part of the end user is pointed at another different region of the gesture reference.

22. The virtual image generation system of claim 13, wherein the control system is configured for controlling the streaming of the textual message in response to the sensed gestural commands by instructing the display system to display at least one word of the textual message when the anatomical part of the end user is pointed at the one region of the gesture reference, and display at least another word of the textual message when the anatomical part of the end user is pointed at another different region of the gesture reference.

* * * * *